(12) United States Patent
Ohashi et al.

(10) Patent No.: US 10,220,914 B2
(45) Date of Patent: Mar. 5, 2019

(54) SADDLE-TYPE VEHICLE

(71) Applicant: KABUSHIKI KAISHA F.C.C., Hamamatsu-shi, Shizuoka (JP)

(72) Inventors: Tatsuyuki Ohashi, Hamamatsu (JP); Kazuyoshi Miyachi, Hamamatsu (JP); Shouji Makita, Hamamatsu (JP); Ryouhei Chiba, Hamamatsu (JP); Kaoru Iida, Hamamatsu (JP); Makoto Sato, Hamamatsu (JP)

(73) Assignee: Kabushiki Kaisha F.C.C., Hamamatsu-Shi (JP)

( * ) Notice: Subject to any disclaimer, the term of this patent is extended or adjusted under 35 U.S.C. 154(b) by 103 days.

(21) Appl. No.: 15/094,792

(22) Filed: Apr. 8, 2016

(65) Prior Publication Data

US 2016/0221641 A1 Aug. 4, 2016

Related U.S. Application Data

(63) Continuation of application No. PCT/JP2014/077222, filed on Oct. 10, 2014.

(30) Foreign Application Priority Data

Oct. 11, 2013 (JP) ................................. 2013-213776

(51) Int. Cl.
*B62M 25/08* (2006.01)
*F16H 63/46* (2006.01)
(Continued)

(52) U.S. Cl.
CPC .............. *B62M 25/08* (2013.01); *B62L 3/06* (2013.01); *B62M 9/04* (2013.01); *B62M 9/08* (2013.01);
(Continued)

(58) Field of Classification Search
CPC ............. F16H 48/068; F16H 2500/102; F16H 2500/104; F16H 48/10; F16H 2500/1025;
(Continued)

(56) References Cited

U.S. PATENT DOCUMENTS

| | | | |
|---|---|---|---|
| 6,474,186 B1 | 11/2002 | Vollmar | |
| 9,453,574 B2* | 9/2016 | Nakano | ................... F16H 61/18 |
| 2010/0286858 A1* | 11/2010 | Otokawa | ................ B60K 6/365 |
| | | | 701/22 |

FOREIGN PATENT DOCUMENTS

| | | |
|---|---|---|
| JP | H08-40250 | 9/1996 |
| JP | 2007-057041 | 3/2007 |

(Continued)

*Primary Examiner* — Stacey A Fluhart
(74) *Attorney, Agent, or Firm* — Knobbe, Martens, Olson & Bear LLP

(57) ABSTRACT

An object of the present invention is to provide a saddle-type vehicle which can switch between the parking brake state and the neutral state using a clutch actuator configured to operate the clutch and thus lower the manufacturing cost. According to the present disclosure, there is provided a saddle-type vehicle which can be driven by a driver sitting on a seat and steering a bar handle. The saddle-type vehicle can comprise a clutch arranged on a power transmitting path from a driving source to a wheel (or wheels) configured to selectively transmit a driving power of the driving source to the wheel and selectively cut off the transmission of driving power of the driving source; a transmission arranged on the power transmitting path configured to shift gears in accordance with the travelling state of the vehicle; and a clutch actuator comprising an electrically operated actuator configured to actuate the clutch, wherein the clutch can be switched by the clutch actuator between a parking brake state, in which the power transmission between the driving source and the driving wheel is performed under a stopped state of the driving source, and a neutral state, in which the (Continued)

power transmission between the driving source and the driving wheel is cut off.

20 Claims, 14 Drawing Sheets

(51) Int. Cl.
    *B62M 9/04*         (2006.01)
    *F16H 9/12*         (2006.01)
    *F16H 61/662*     (2006.01)
    *B62L 3/06*         (2006.01)
    *B62M 9/08*         (2006.01)

(52) U.S. Cl.
    CPC ......... *F16H 9/12* (2013.01); *F16H 61/66272*
        (2013.01); *F16H 63/46* (2013.01); *F16H*
        *61/662* (2013.01); *F16H 2061/66277* (2013.01)

(58) Field of Classification Search
    CPC . F16H 2500/10412; F16H 2500/10437; F16H
        9/12; F16H 63/46
    See application file for complete search history.

(56) References Cited

FOREIGN PATENT DOCUMENTS

| JP | 2009-197990 | | 9/2009 | |
|---|---|---|---|---|
| JP | 2011-163470 | | 8/2011 | |
| JP | 2011-174489 | | 9/2011 | |
| JP | 2011207295 | A * | 10/2011 | ............... B60K 6/48 |
| JP | 2012-149689 | | 8/2012 | |
| JP | 2013-029130 | | 2/2013 | |

\* cited by examiner

[Fig 1]
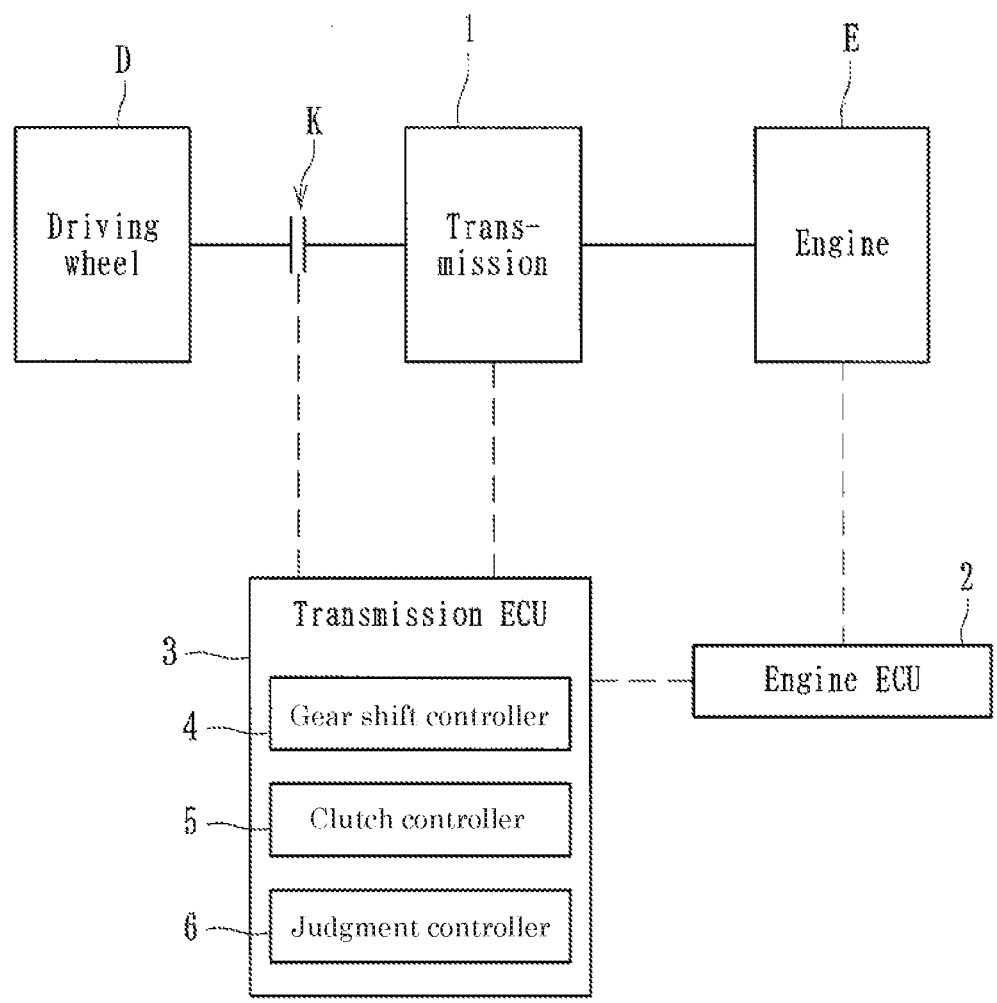

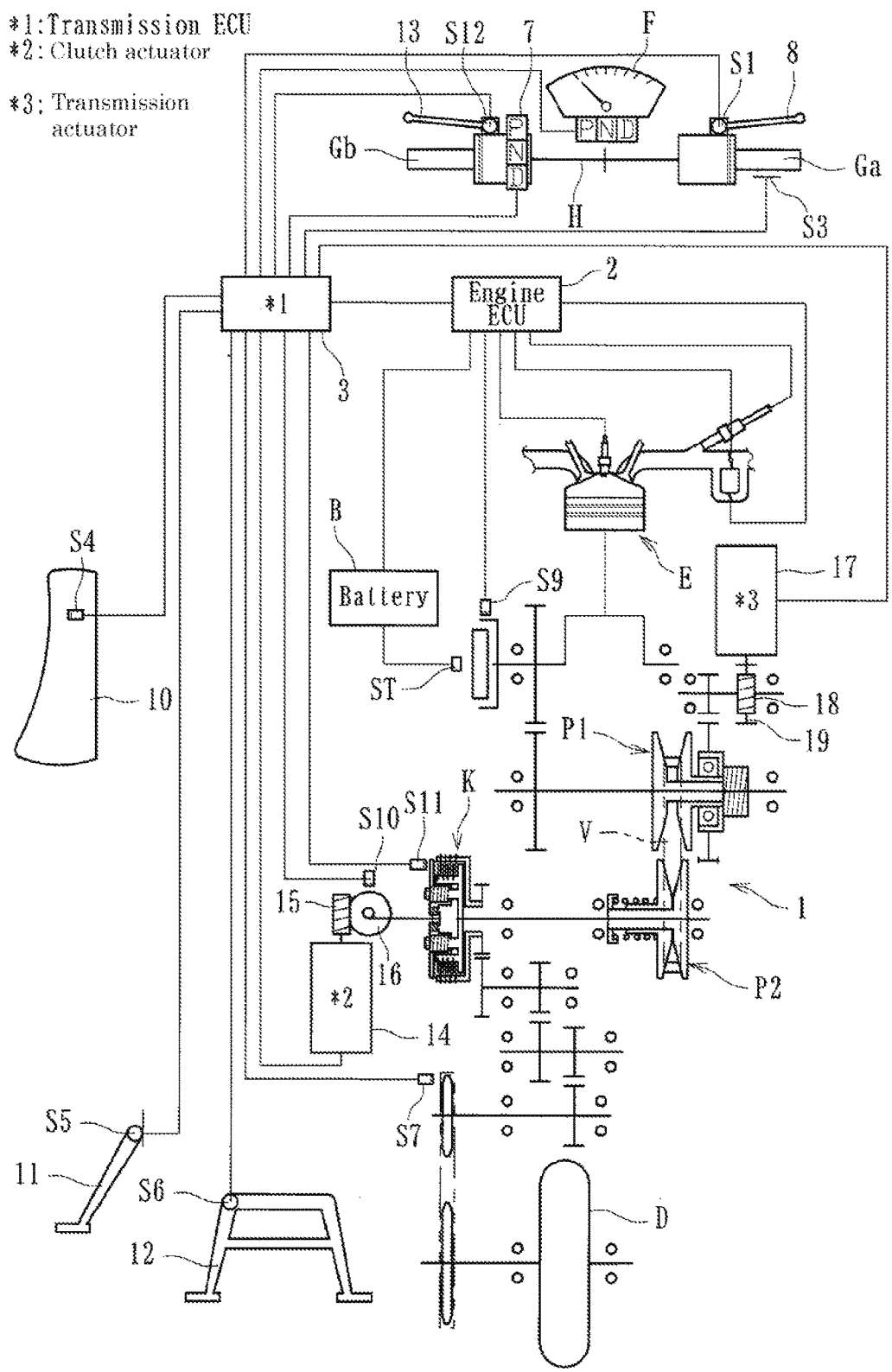
[Fig 2]

[Fig 3]
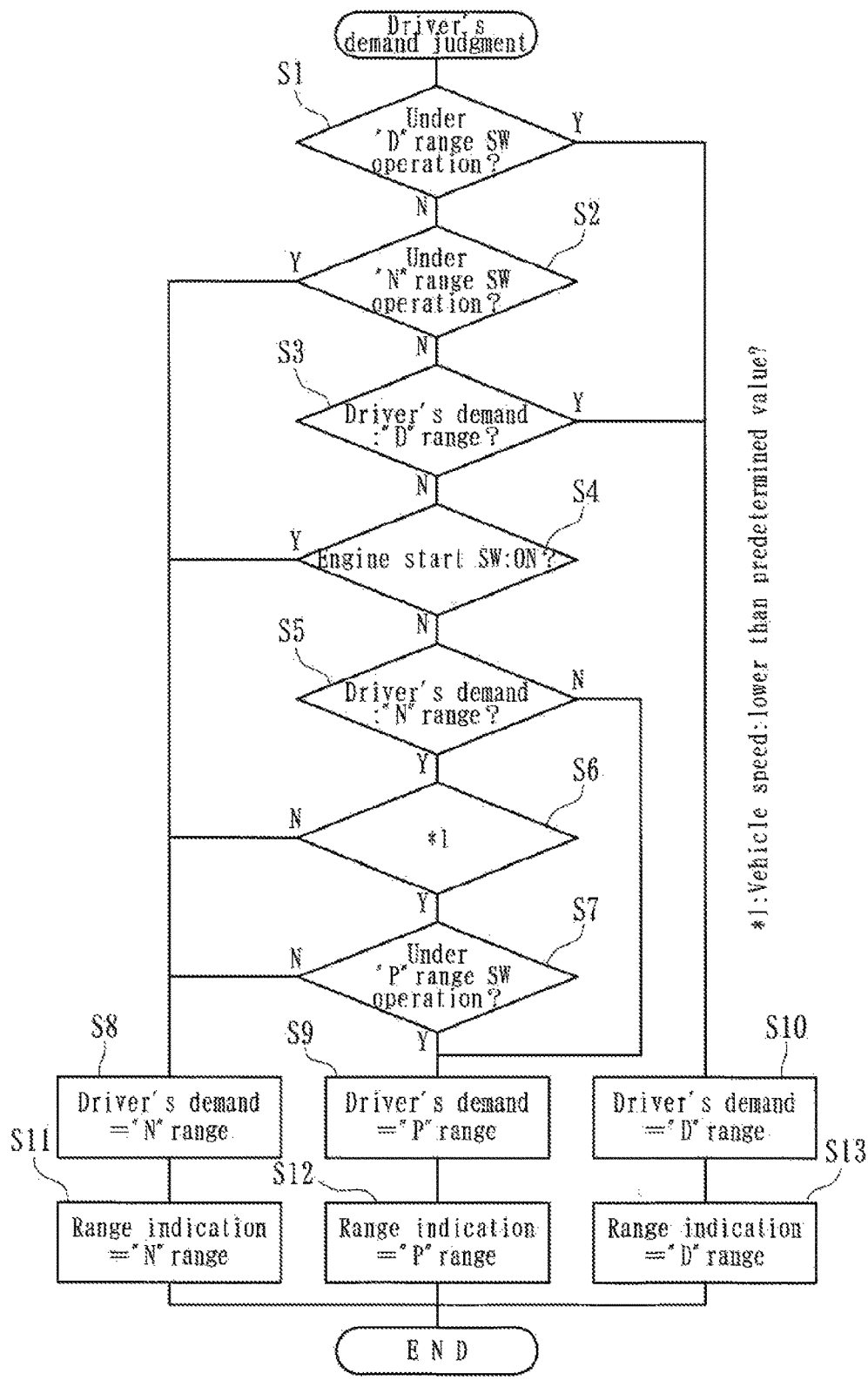

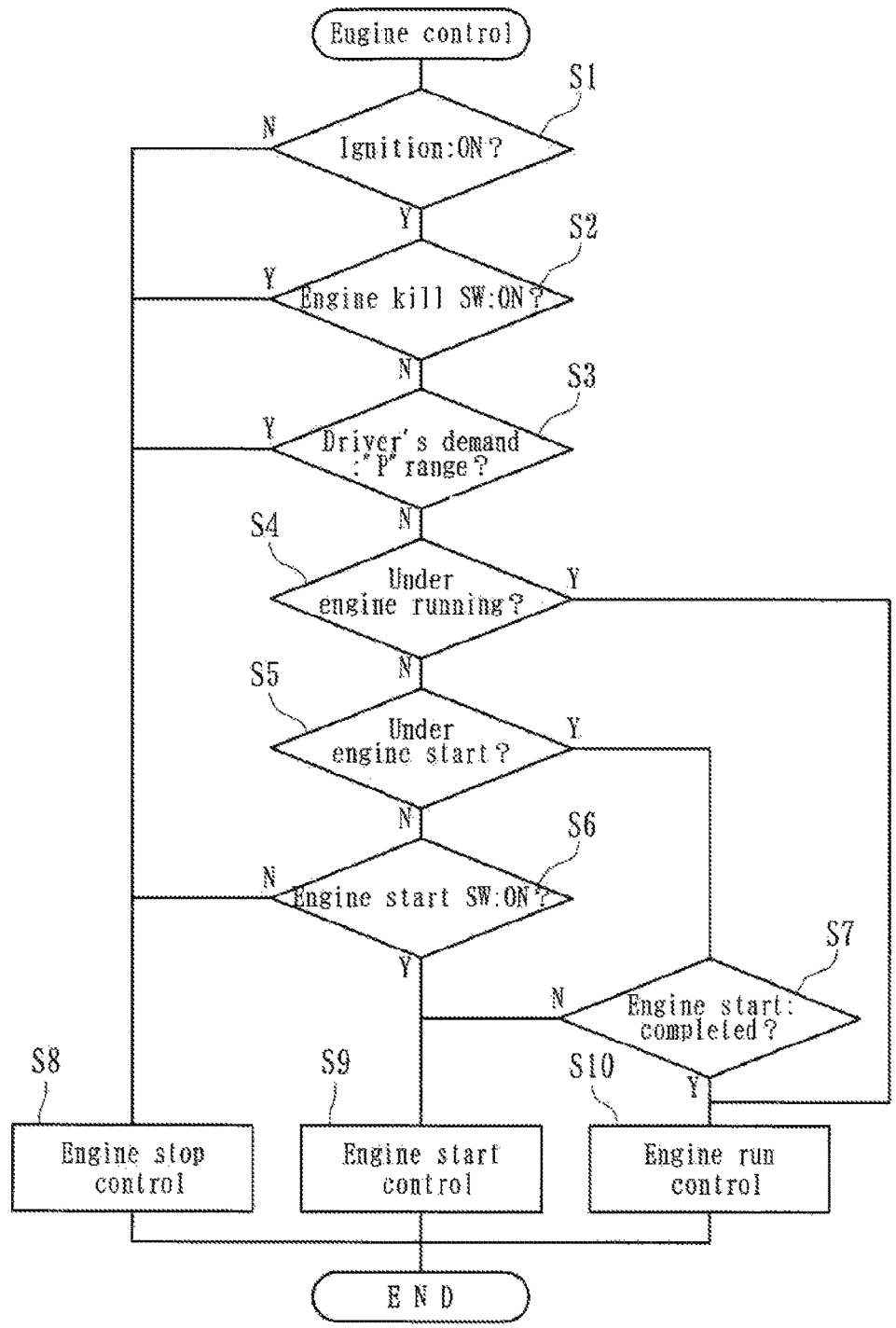
[Fig 4]

[Fig 5]
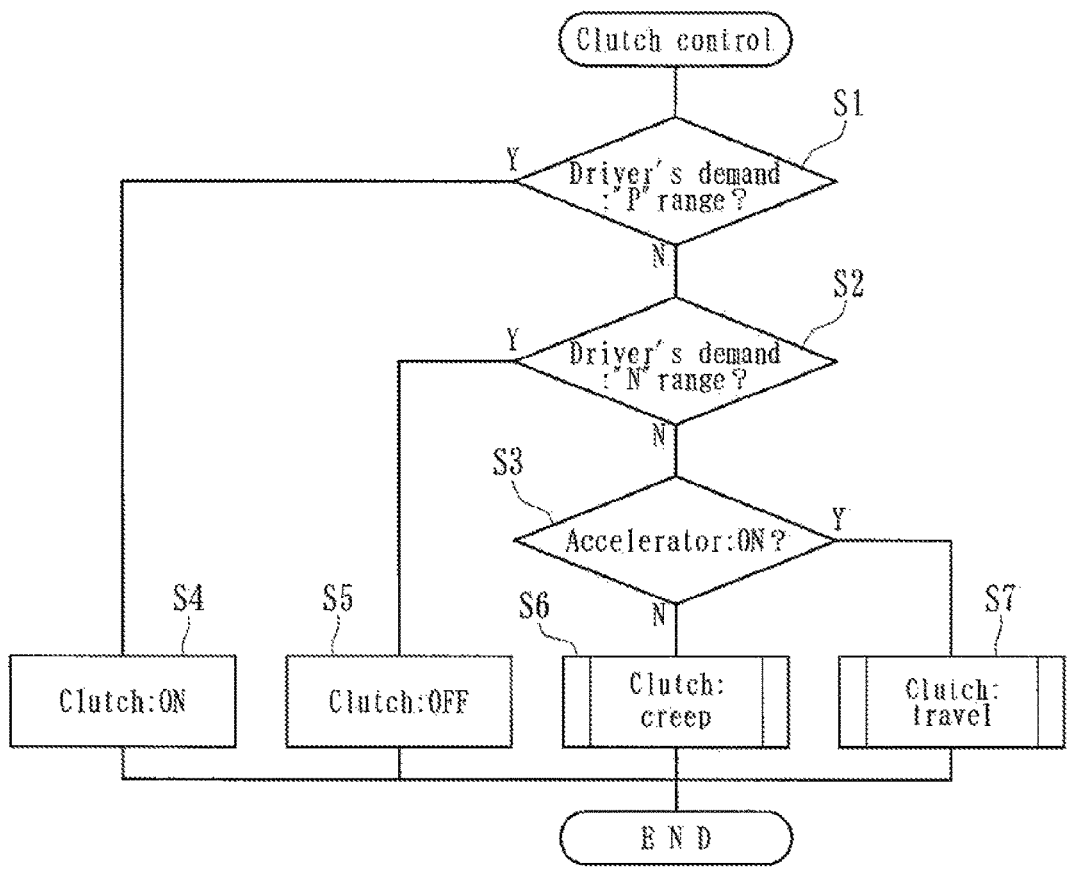

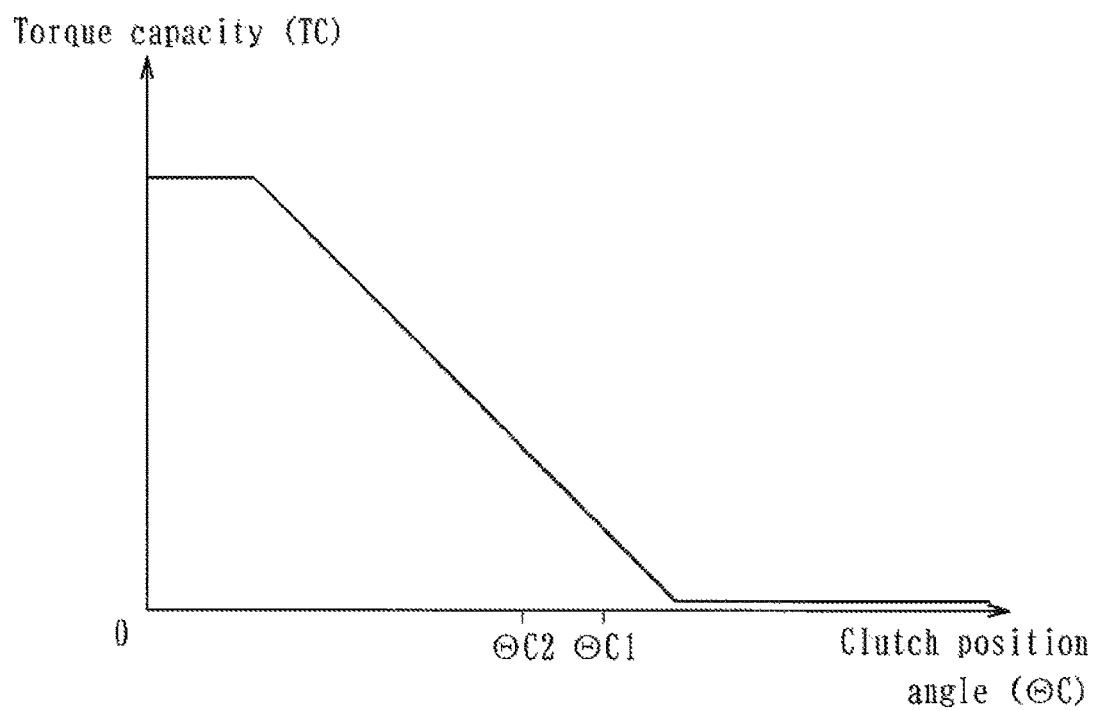
[Fig 6]

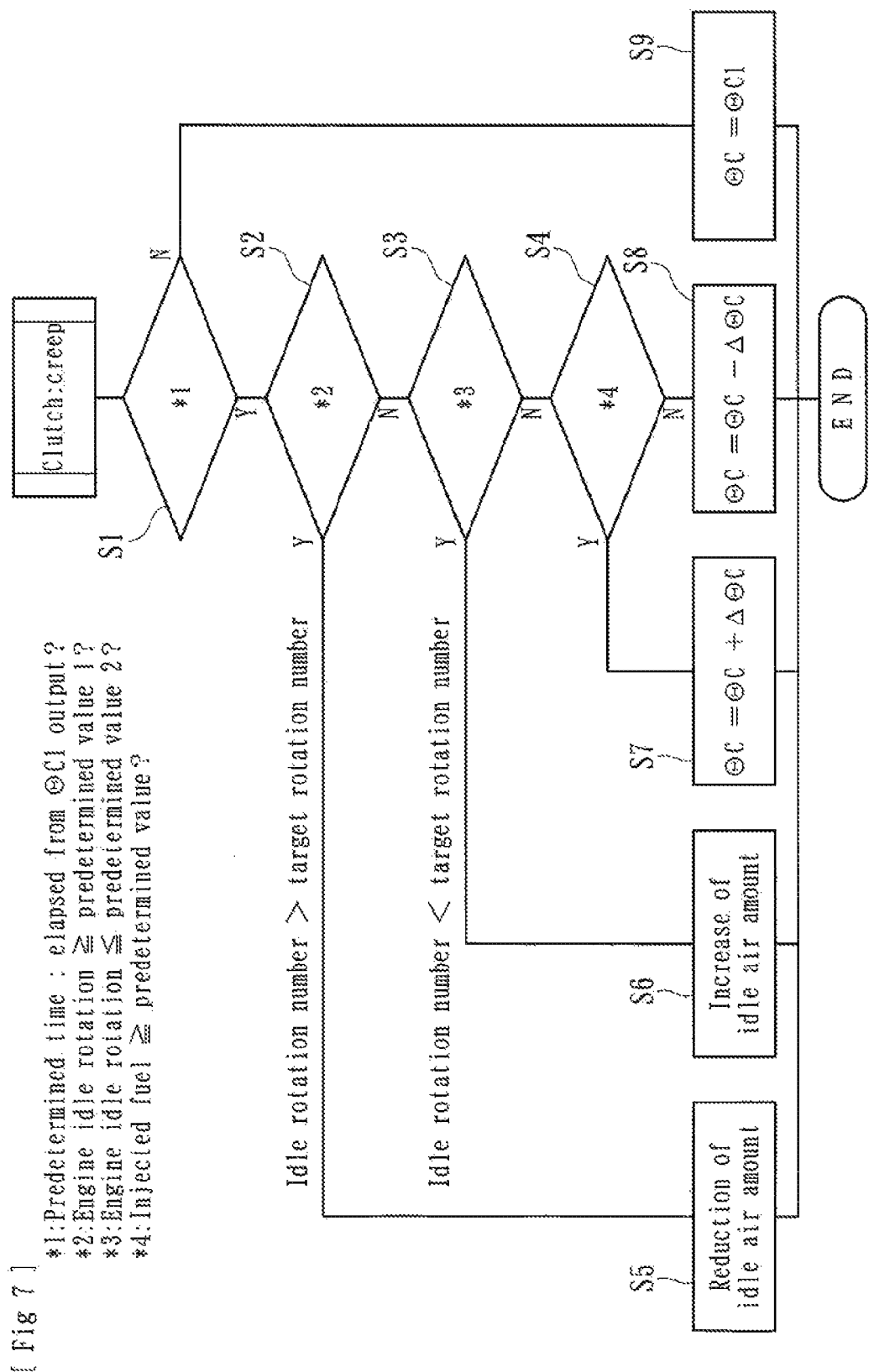

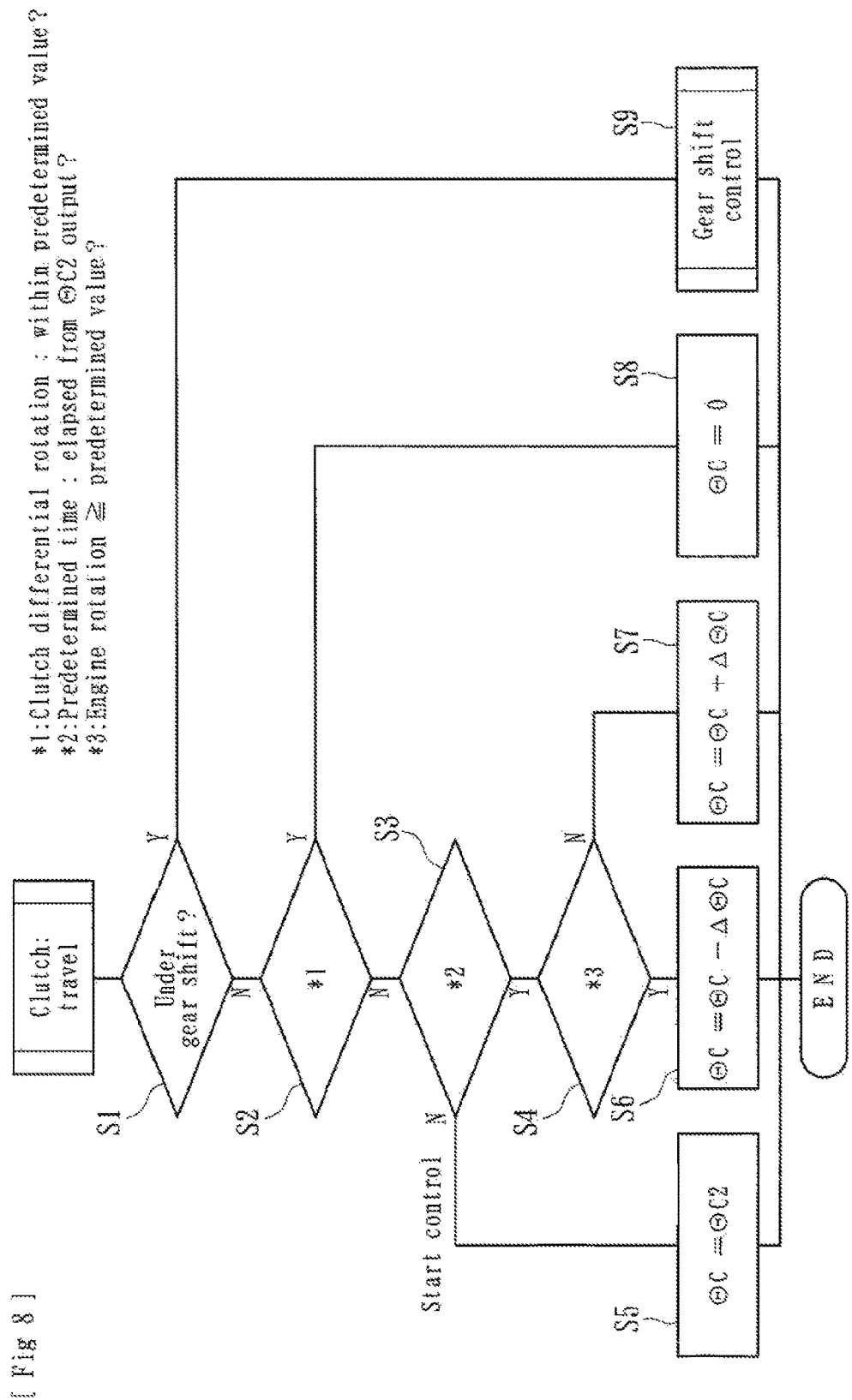
[Fig 8]

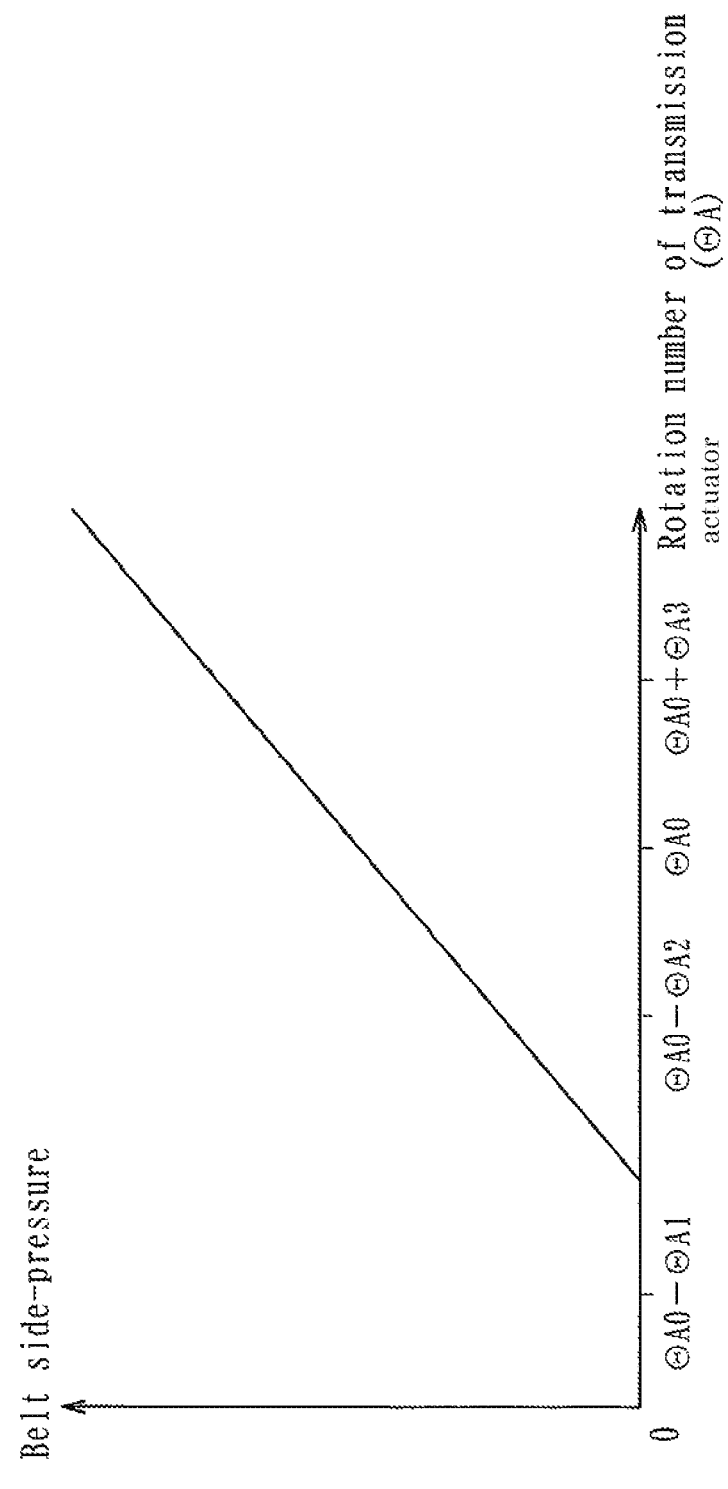
[Fig 9]

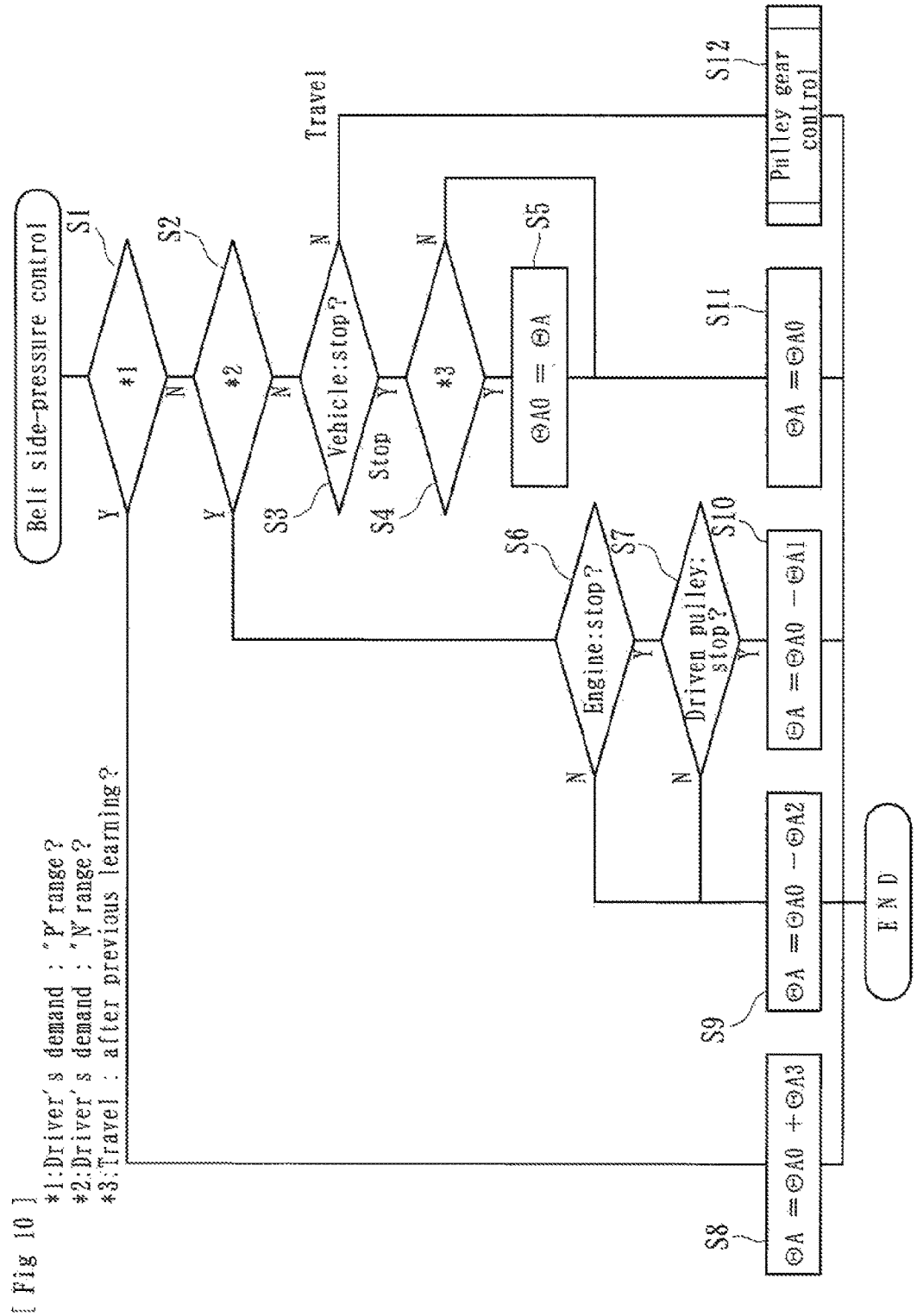

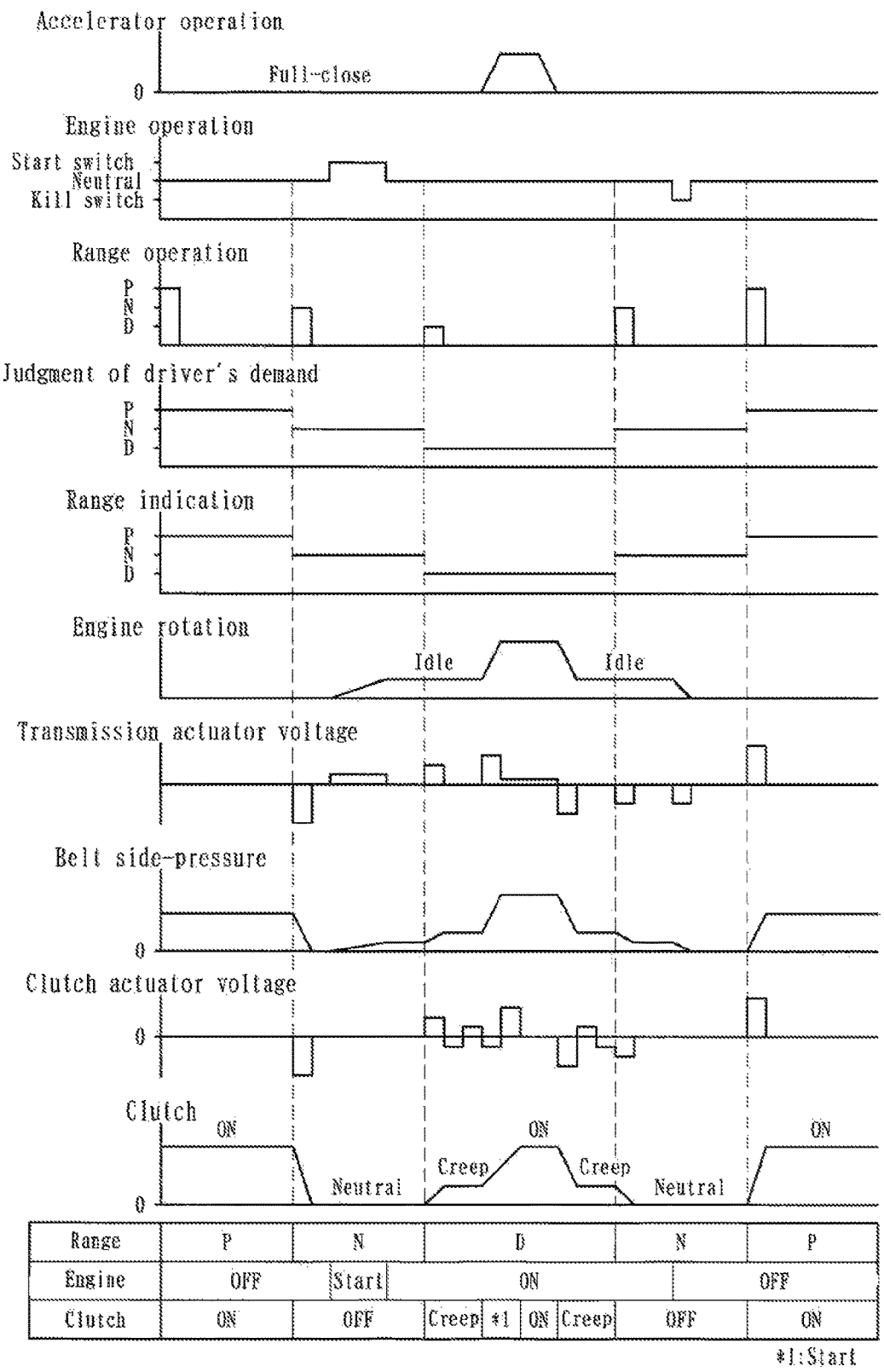

[Fig 12]
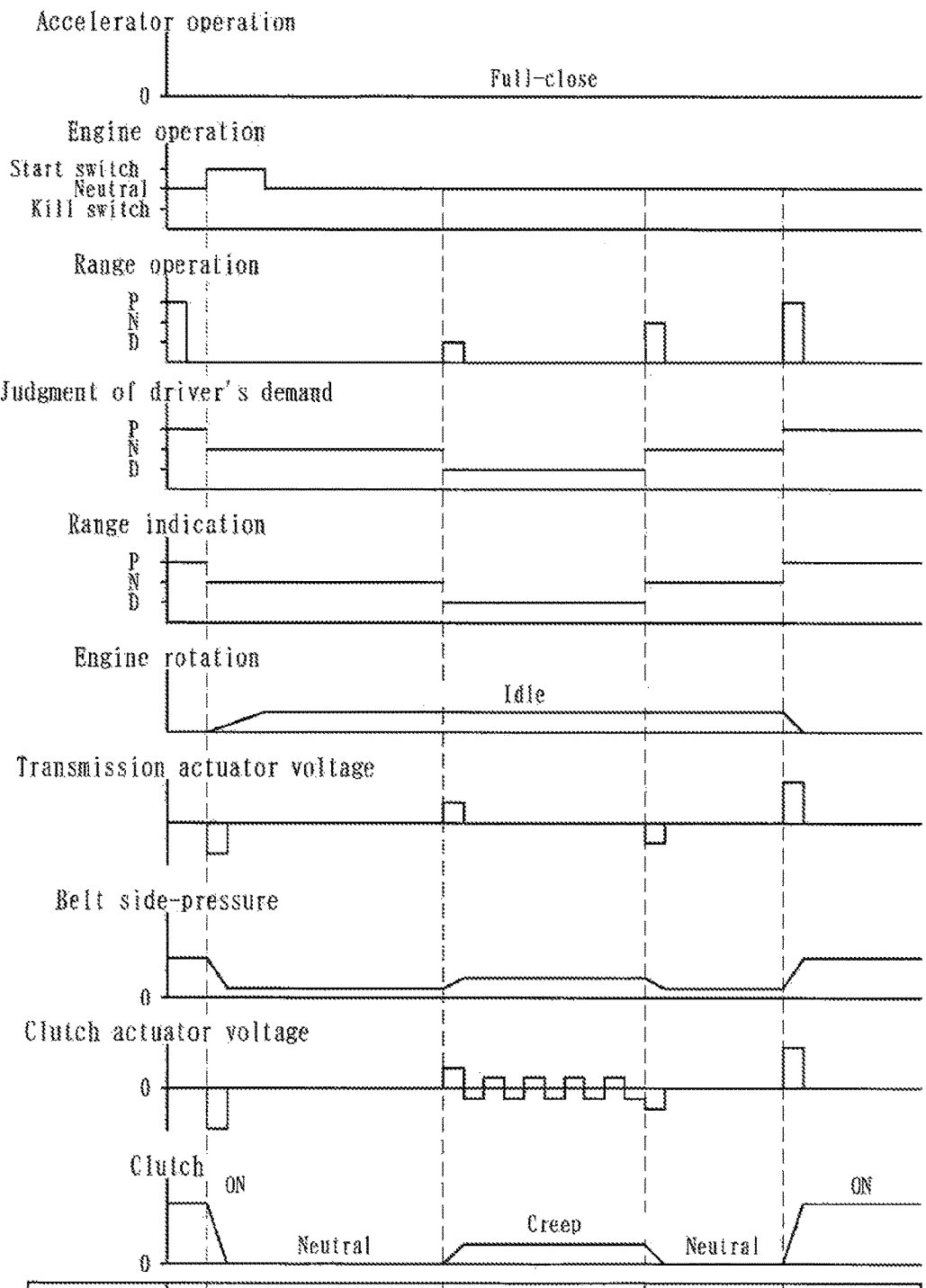

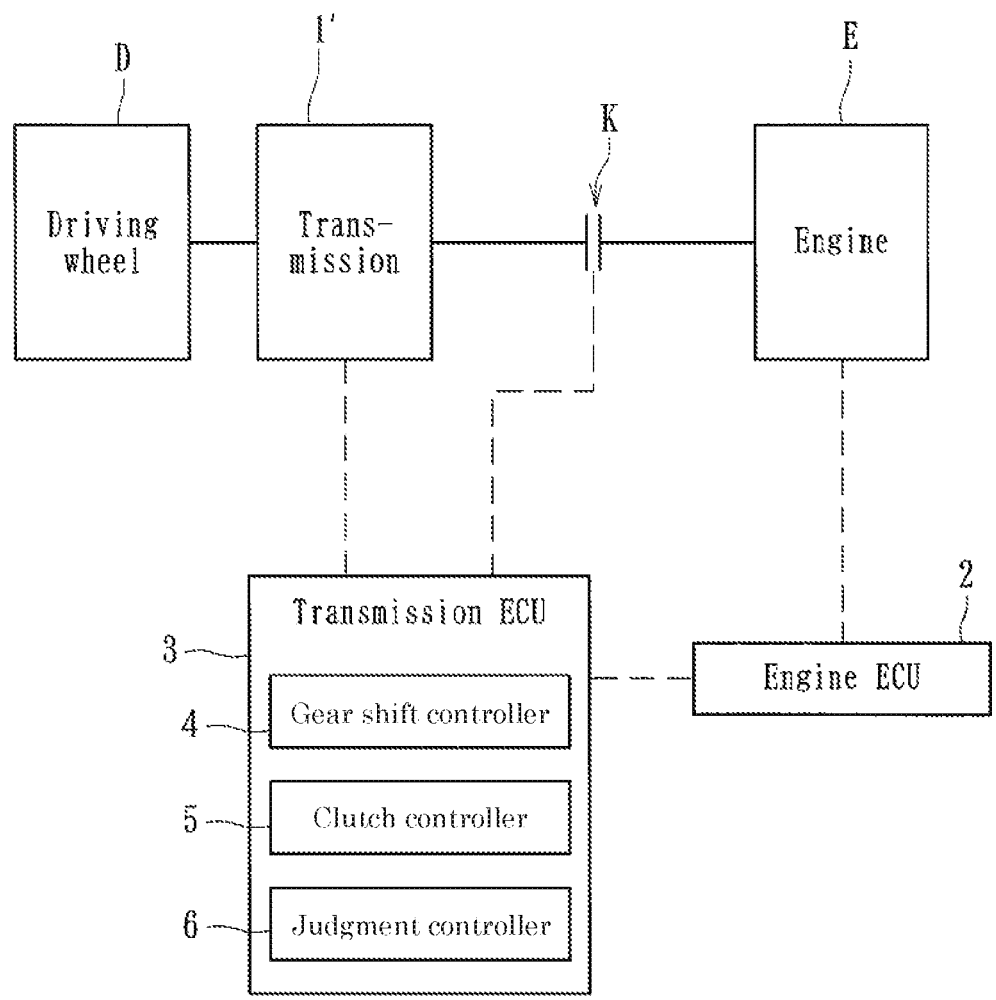
[Fig 13]

[Fig 14]
*1: Transmission ECU
*2: Clutch actuator
*3: Transmission actuator
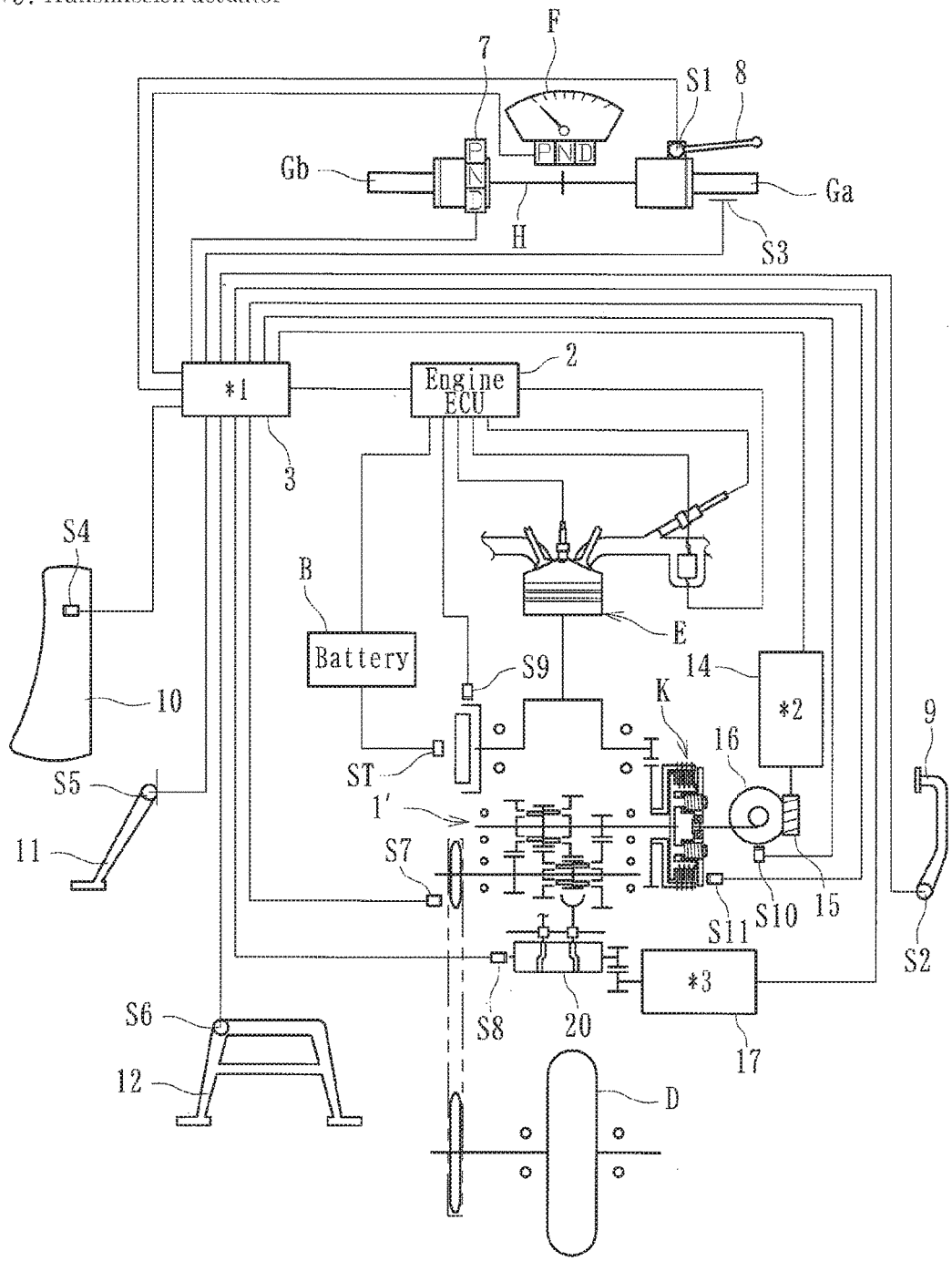

SADDLE-TYPE VEHICLE

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Disclosure

The present disclosure relates to saddle-type vehicles driven by a driver sitting on a seat of the vehicle and steering a bar handle.

Description of the Related Art

Various parking brake mechanisms have been previously proposed for locking a wheel of a two-wheeled vehicle when parking. For example, JP 2009-197990 A discloses a parking brake mechanism in which the wheel of a two-wheeled vehicle is locked by placing its clutch into a connected state (in which power is transmittable from an engine to a wheel) when the engine is in a stopped state. More particularly, the parking brake mechanism of JP 2009-197990 A comprises an elastic member and an elastic retainer within the clutch. It is structured so that a group of clutch discs are press-contacted to each other by the elastic member and the elastic retainer via a pressure plate when the engine is in a stopped state in order to lock the wheel using friction of the engine.

Such a parking brake mechanism is structured so that the press-contacted state of the clutch discs can be released with a driver grasping a clutch lever. The parking brake state (in which the wheel is locked when the engine is in the stopped state) is thus switched to a neutral state (in which the wheel is not locked when the engine is in the stopped state). That is, the parking brake state can be attained by locking the wheel using the elastic member and the elastic retainer when the engine is in the stopped state, and the system can be switched from the parking brake state to the neutral state by a driver's grasping the clutch lever.

SUMMARY

Because the parking brake mechanism of the prior art requires separate parts for the parking brake such as the elastic member and the elastic retainer within the clutch, the complicated structure and increased number of parts raise the manufacturing cost of the clutch. In addition, since the parking brake mechanism of the prior art requires further additional parts for manual operation such as a clutch lever and other actuating mechanisms to switch between the parking brake state and the neutral state, the number of parts and thus the manufacturing cost are further increased.

Thus, it can be beneficial to provide a saddle-type vehicle which can switch between the parking brake state and the neutral state using a clutch actuator (which can serve as a clutch actuating means) for operating the clutch and thus lower the manufacturing cost.

Thus, in some embodiments, a saddle-type vehicle which can be driven by a driver sitting on a seat of the vehicle and steering a bar handle has a clutch arranged on a power transmitting path from a driving source to a driving wheel (or wheels). The clutch can be configured to transmit a driving power of the driving source to the driving wheel and to cut off the transmission of driving power of the driving source. The vehicle can include a transmission arranged on the power transmitting path for shifting gears in accordance with the travelling state of the vehicle and a clutch actuator comprising an electrically operated actuator for actuating the clutch. In some embodiments, the clutch can be switched by the clutch actuator between a parking brake state, in which the power transmission between the driving source and the driving wheel is performed under a stopped state of the driving source, and a neutral state, in which the power transmission between the driving source and the driving wheel is cut off.

In some embodiments, the state of the clutch can be maintained when the clutch actuator is in a non-electrically energized state.

In some embodiments, the saddle-type vehicle comprises an operating range selector (which can serve as an operating means) for selecting a range for attaining the parking brake state (e.g., "P" range), a range for attaining the neutral state (e.g., "N" range) and a range for attaining a driving state (e.g., "D" range), wherein the clutch and the transmission can be controlled under the driving state in accordance with the travelling state of the vehicle.

In some embodiments, a selecting operation of the "P" range by the operating range selector can be completed only when the vehicle speed is lower than a predetermined value.

In some embodiments, a selecting operation of the "P" range by the operating range selector can be completed only at the "N" range.

In some embodiments, a selecting operation of the "P" range by the operating range selector can be completed only when the vehicle speed is lower than a predetermined value and only from the "N" range.

In some embodiments, the parking brake state can be attained by automatically stopping the driving source on the condition that the selecting operation of the "P" range by the operating range selector has been performed during driving of the driving source.

In some embodiments, a switching from the "P" range to the "N" range can be automatically attained on the condition that a starting operation of the driving source has been performed at the "P" range.

In some embodiments, the saddle-type vehicle comprises an indicator for performing indications corresponding to the "P" range, the "N" range and the "D" range.

In some embodiments, the transmission comprises a continuously variable transmission ("CVT") comprising a belt forming part of the power transmitting path and a pair of pulleys sandwiching and suspending the belt.

In some embodiments, the slippage of the belt relative to the pulleys under the parking brake state can be limited by increasing a sandwiching force of the pulleys relative to the belt under the parking brake state to be larger than the sandwiching force of the pulleys relative to the belt in the "D" range while the vehicle is stopped.

In some embodiments, the neutral state can be attained at the "N" range by setting the sandwiching force of the pulleys relative to the belt so that the power transmission is not performed by the belt when the driving source is in the stopped state, and the slippage of the belt relative to the pulleys can be limited by setting the sandwiching force of the pulleys relative to the belt so that the power transmission is performed by the belt as well as so that the sandwiching force is smaller when in the range for attaining the neutral state and while the driving source is in the driving state than the sandwiching force in the "D" range while the vehicle is stopped.

In some embodiments, the saddle-type vehicle further comprises a transmission actuator (which can serve as a transmission actuating means) which comprises an electrically operated actuator operable to change the pulley position under an electrically energized state so as to adjust a sandwiching force of the pulleys relative to the belt when the belt is not being rotated, adjust the pulley gear ratio while the sandwiching force of the pulleys relative to the belt is applied, and hold the sandwiching force of the pulleys relative to the belt under a non-electrically energized state of the transmission actuator.

In some embodiments, when a sandwiching force by the pulleys relative to the belt is applied to the belt in the "D" range, the clutch can be selectively operated in accordance with the driver's input between a travelling control including a start control when the accelerator operation is done or a travelling control having a gear shift control, and a creep control in which the vehicle can travel under an idling state of the driving source without operating the accelerator.

In some embodiments, the transmission is a stepwise variable transmission.

According to some embodiments, since the clutch can be switched by the clutch actuator between a parking brake state, in which the power transmission between the driving source and the driving wheel is performed under a stopped state of the driving source, and a neutral state, in which the power transmission between the driving source and the driving wheel is cut off, it is possible to switch the parking brake state and the neutral state using the clutch actuator rather than a manual clutch lever and thus lower the manufacturing cost of the clutch.

According to some embodiments, since the state of the clutch can be maintained when the clutch actuator is under a non-electrically energized state, it is possible to hold either the parking brake state or the neutral state without supplying electric power to the clutch actuator.

According to some embodiments, since the saddle-type vehicle further comprises an operating range selector for selecting a "P" range for attaining the parking brake state, a "N" range for attaining the neutral state and a "D" range for attaining a driving state, wherein the clutch and the transmission can be controlled under the driving state in accordance with the travelling state of the vehicle, it is possible to reliably perform operations based on input (e.g., demand) of a driver.

According to some embodiments, since a selecting operation of the "P" range by the operating range selector can be completed only when the vehicle speed is lower than a predetermined value, it is possible to prevent the travelling state of the vehicle from being shifted to the parking brake state during travel of the vehicle at a high speed.

According to some embodiments, since a selecting operation of the "P" range by the operating range selector can be completed only from the "N" range, it is possible to prevent the travelling state of the vehicle from being shifted to the parking brake state if a driver would unintentionally select the "P" range due to erroneous operation of the operating range selector in the "D" range.

According to some embodiments, since a selecting operation of the "P" range by the operating range selector can be completed only when the vehicle speed is lower than a predetermined value and only from the "N" range, it is possible to prevent the travelling state of the vehicle from being shifted to the parking brake state during high speed travel of the vehicle in the "D" range.

According to some embodiments, since the parking brake state can be attained by automatically stopping the driving source on the condition that the selecting operation of the "P" range by the operating range selector has been performed during driving of the driving source, it is unnecessary to manually stop the driving source when selecting the "P" range during driving of the driving source. It is thereby possible to improve the operability of the vehicle.

According to some embodiments, since switching from the "P" range to the "N" range can be automatically attained on the condition that a starting operation of the driving source has been performed at the "P" range, it is unnecessary to manually shift the operating means from the "P" range to the "N" range after starting the driving source. It is thereby possible to improve the operability of the vehicle.

According to some embodiments, since the saddle-type vehicle further comprises an indicator for performing indications corresponding to the "P" range, the "N" range, and the "D" range, it is possible to accurately inform a driver via the indicator that it has switched to the "N" range when the transmission had been automatically switched from the "P" range to the "N" range on the condition that the starting operation of the driving source had been performed in the "P" range.

According to some embodiments, since the transmission comprises a continuously variable transmission (CVT) comprising a belt forming part of the power transmitting path and a pair of pulleys sandwiching and suspending the belt, it is possible to smoothly perform the gear shift and to switch the parking brake state and the neutral state using the clutch actuator to operate the clutch in the vehicle provided with the CVT and thus to lower the manufacturing cost of the clutch.

According to some embodiments, since the slippage of the belt relative to the pulleys under the parking brake state can be limited by increasing the sandwiching force of the pulleys relative to the belt under the parking brake state to be larger than the sandwiching force of the pulleys relative to the belt in the "D" range while the vehicle is stopped, it is possible to prevent cutting off the power transmitting path through the CVT and securely keep the parking brake state, in which power transmission between the driving source and the driving wheel is enabled.

According to some embodiments, since the neutral state can be attained at the "N" range by setting the sandwiching force of the pulleys relative to the belt so that the power transmission is not performed by the belt when the driving source is in the stopped state, and the slippage of the belt relative to the pulleys can be limited by setting the sandwiching force of the pulleys relative to the belt so that the power transmission is performed by the belt as well as so that the sandwiching force is smaller when in the "N" range and while the driving source is in the driving state than the sandwiching force in the "D" range while the vehicle is stopped, the neutral state can be reliably attained because both the clutch and the transmission are cut off when the driving source is in the stopped state. In addition, the clutch is cut off but the transmission is in a power transmitting state when the driving source is in the driving state and thus slippage of the belt can be prevented.

According to some embodiments, since the saddle-type vehicle further comprises a transmission actuator which comprises an electrically operated actuator and operable to change the pulley position under the electrically energized state so as to adjust the sandwiching force of the pulleys relative to the belt when the belt is not being rotated and to adjust the pulley gear ratio while the sandwiching force of the pulleys relative to the belt is applied, hold the sandwiching force of the pulleys relative to the belt under the non-electrically energized state of the transmission actuator, it is possible to maintain both the power transmitting state and the power cut-off state without supplying electric power to the transmission actuator.

According to some embodiments, since when the sandwiching force of the pulleys relative to the belt is applied to the belt in the "D" range, the clutch can be selectively operated in accordance with the driver's input between a travelling control including a start control when the accelerator operation is done or a travelling control having a gear shift control, and a creep control in which the vehicle can travel under an idling state of the driving source without operating the accelerator, it is possible to quickly start the vehicle corresponding to the accelerator operation when the driving source is accelerated from a stopped state of the vehicle in which the driving source is idling. It is also possible to start the vehicle at a low speed due to continuation of the creep control when brake releasing operation is performed without operating the accelerator from the stopped state of the vehicle in which the driving source is idling. Thereby, a delicate accelerator operation is not necessary.

According to some embodiments, since the transmission is a stepwise variable transmission, it is possible to reliably select the gear steps corresponding to the vehicle speed and also to switch the parking brake state and the neutral state using the clutch actuator for operating the clutch and thus to lower manufacturing cost of the clutch.

BRIEF DESCRIPTION OF THE DRAWINGS

FIG. 1 illustrates a block diagram showing a concept of the saddle-type vehicle according to a first embodiment of the present disclosure;

FIG. 2 illustrates a schematic view showing a general structure of the saddle-type vehicle of FIG. 1;

FIG. 3 illustrates a flowchart showing control contents for performing judgment of the judgment controller of the saddle-type vehicle of the present disclosure;

FIG. 4 illustrates a flowchart showing control contents of the engine controller of the saddle-type vehicle of the present disclosure;

FIG. 5 illustrates a flowchart showing control contents of the clutch controller of the saddle-type vehicle of the present disclosure;

FIG. 6 illustrates a graph showing a relation between the clutch position angle and the torque capacity;

FIG. 7 illustrates a flowchart showing control contents of the torque capacity of the clutch during the creep control of the saddle-type vehicle of the present disclosure;

FIG. 8 illustrates a flowchart showing control contents of the torque capacity of the clutch during the travel of the saddle-type vehicle of the present disclosure;

FIG. 9 illustrates a graph showing characteristics of belt side-pressure of the saddle-type vehicle of the present disclosure;

FIG. 10 illustrates a flowchart showing control contents of the belt side-pressure of the saddle-type vehicle of the present disclosure;

FIG. 11 illustrates a time chart showing the start and stop of the engine at the "N" range when a switching of the ranges is performed in the saddle-type vehicle of the present disclosure;

FIG. 12 illustrates a time chart of the "P" range's selective operation during engine start and engine driving in the "P" range when a switching of ranges is performed in the saddle-type vehicle of the present disclosure;

FIG. 13 illustrates a block diagram showing a concept of the saddle-type vehicle according to a second embodiment of the present disclosure; and FIG. 14 illustrates a schematic view showing a general structure of the saddle-type vehicle of FIG. 13.

DETAILED DESCRIPTION

Preferable embodiments including various combinations of the present inventions are described below with reference to the accompanying drawings.

A saddle-type vehicle, in accordance with some embodiments, is shown as a two-wheeled vehicle configured to be driven by a driver sitting on a seat and steering a bar handle. As shown in FIGS. 1 and 2, the saddle-type vehicle can comprise an engine E (which can serve as a driving source), a bar handle H, a first brake 8 (which can serve as a first brake means) and a second brake 13 (which can serve as a second brake means), a transmission 1 which can comprise a continuously variable transmission (CVT), a clutch K, an engine ECU (electronic control unit) 2, a transmission ECU 3, and an operating range selector 7 (which can serve as an operating means). A reference character "ST" denotes a starter configured to start the engine E.

The bar handle H can be a steering handle one tip end of which is a grasping grip Gb adapted to be gripped by a driver's hand (e.g., left hand) and the other tip end of which is a throttle grip Ga configured to be gripped by a driver's other hand (e.g., right hand) and rotated for accelerator operation. An operating range selector 7 can also be mounted on the bar handle H at the base end position of the grasping grip Gb. Modes (e.g., "N" range, "D" range, and "P" range) of the transmission 1 can be selectively changed with a driver operating the operating range selector 7 by his hand (e.g., left hand) grasping the grip Gb.

The throttle grip Ga can be operated via rotation by a driver and opening and closing of a throttle (fuel injection valve) of the engine E to have a desired vehicle speed. In addition, a switch case can be mounted on the bar handle H at a base end position of the throttle grip Ga and can be configured to operate various electric parts of the vehicle.

The first brake 8 can comprise a lever swingably operated by a driver grasping the throttle grip Ga and the vehicle (e.g., two-wheeled vehicle) can be braked by a front wheel brake (not shown) when the swing motion of the lever is detected by a brake operation detection sensor S1. The second brake 13 can comprise a lever swingably operated by a driver grasping the throttle grip Gb and the vehicle can be braked by a rear wheel brake (not shown) when the swing motion of the lever is detected by a brake operation detection sensor S12.

The vehicle, in some embodiments, can comprise detection sensors S6, S5 configured to detect states (used state or unused state) of a main stand 12 and a side stand 11 respectively configured to support the vehicle, a detection sensor S4 configured to detect whether the seat 10 is used, and a detection sensor S3 configured to detect whether the throttle grip Ga is grasped. The detection sensor S3 may be a sensor which can detect whether the throttle grip Ga and/or the grip Gb are grasped. These detection sensors S3, S4, S5, and S6 can be electrically connected to the transmission ECU 3 and can transmit detected signals to the transmission ECU 3.

The transmission 1 and the clutch K can be arranged on the power transmitting path from the engine E to the driving wheel D. The clutch K can be a multiple disc clutch arranged on the power transmitting path from the engine E to the driving wheel D and configured to transmit and cut off the driving power of the engine E to the driving wheel D. The clutch K can be operated by a clutch actuator 14 and switched between an "ON" state in which the driving power of the engine E can be transmitted to the driving wheel D and an "OFF" state in which the driving power of the engine E cannot be transmitted to the driving wheel D.

In some embodiments, the clutch K can comprise a clutch position angle sensor S10 and a clutch rotation sensor S11. Detected signals from the sensors S10, S11 can be transmitted to the transmission ECU 3. The press-contacted condition of the clutch discs can be determined from the detected signals and thus can detect the torque capacity (TC) of the clutch K.

The clutch actuator 14 can comprise an electrically operated actuator (e.g., a motor) configured to actuate the clutch K. A worm reduction gear comprising a worm gear 15 and worm wheel 16 can be interposed on an output transmission mechanism from the clutch actuator 14 to the clutch K and can be configured to maintain the state of the clutch K when the clutch actuator 14 is in a non-electrically energized state.

In some embodiments, the transmission 1 can be a CVT which can be configured to automatically change a gear ratio according to a mode set by the operating range selector 7, the accelerator operation, and the vehicle speed. The transmission 1 can be arranged on the power transmitting path at the upstream side (e.g., engine side) of the clutch K. As shown in FIG. 2, the transmission 1 can comprise a belt V forming part of the power transmitting path and a pair of pulleys P1, P2. The transmission 1 can be configured so that a predetermined gear ratio can be obtained by changing positions of the pulleys P1, P2 using a transmission actuator 17.

The transmission actuator 17 can be an electrically operated actuator (e.g., a motor) and can be configured to operate to change the pulley position under the electrically energized state so as to adjust the sandwiching force of the pulleys relative to the belt V as intended when the belt V is not being rotated and to adjust the pulley gear ratio as intended while applying the sandwiching force of the pulleys relative to the belt V. A worm reduction gear comprising a worm gear 18 and worm wheel 19 can be interposed on an output transmission mechanism from the transmission actuator 17 to the transmission 1. The worm reduction gear can be configured to maintain the sandwiching force of the belt V when the transmission actuator 17 is under a non-electrically energized state.

The engine ECU (e.g., engine controller) 2 can comprise a microcomputer or other controller mechanism configured to control the engine E. The engine ECU 2 can be supplied with electric power from a battery B of the vehicle and can be electrically connected to the transmission ECU 3 and configured to transmit and receive electric signals therebetween. The engine ECU 2 can be configured to perform the idle-stop and automatically stop the engine when predetermined conditions are satisfied. The "idle-stop" can be defined as a condition in which the idling rotation of engine E is stopped when predetermined conditions are satisfied in order to suppress the fuel consumption.

Similarly to the engine ECU 2, the transmission ECU 3 can comprise a microcomputer or other controller mechanism electrically connected to the engine ECU 2 and configured to transmit and receive electric signals therebetween as well as electrically connected to actuators (e.g., transmission actuator 17, clutch actuator 14) of the transmission 1 and the clutch K. As shown in FIG. 1, the transmission ECU 3 can be formed of a gear shift controller 4 (which can serve as a gear shift control means) configured to control the transmission 1, a clutch controller 5 (which can serve as a clutch controller means) configured to control the clutch K, and a judgment controller 6 (which can serve as a judgment means).

As shown in FIG. 2, the transmission ECU 3 can be further electrically connected to the vehicle speed sensor S7 configured to detect the vehicle speed and a clutch position-angle sensor S10 and a clutch rotation sensor S11 configured to detect the state of the clutch K. Accordingly, the transmission ECU 3 can be configured to determine the vehicle speed and the state of the clutch K. A reference character "S9" denotes an engine rotation sensor electrically connected to the engine ECU 2.

In some embodiments, the judgment controller 6 of the transmission ECU 3 is configured to judge the driver's input based on operation conditions (e.g., operation of the operating range selector 7) of the driver relative to the vehicle. The clutch actuator 14 can be configured to switch the clutch K between a parking brake state, in which the power transmission between the engine E and the driving wheel D is performed under a stopped state of the engine E, and a neutral state, in which the power transmission between the engine E and the driving wheel D is cut off.

That is, when the "P" range is selected by the operating range selector 7, which may be by pushing a button switch corresponding to the "P" range to the "ON" position, the clutch actuator 14 can be configured to operate the clutch K to occupy the "ON" state in which the discs are press-contacted to each other by a pressure plate to transmit driving power of the engine E to the driving wheel D. Similarly, when the "N" range is selected by the operating range selector 7, which may be by pushing a button switch corresponding to the "N" range to the "ON" position, the clutch actuator 14 can be configured to operate the clutch K to occupy the "OFF" state in which the discs are released from each other and the driving power of the engine E is not transmitted to the driving wheel D.

In addition, both the clutch K and the transmission 1 can be configured to be controlled in accordance with the travelling state of the vehicle by the clutch controller 5 and the gear shift controller 4 when the "D" range is selected by the operating range selector 7. That is, the operating range selector 7 can be configured to select the "P" range, the "N" range, and the "D" range by controlling the clutch K and the transmission 1 in accordance with the travelling state of the vehicle.

Accordingly, since the power transmission between the engine E and the driving wheel D can be enabled when the engine E is in the stopped state if the parking brake state is selected, it is possible to easily and reliably park the vehicle on a sloped surface, because the driving wheel D is locked due to friction of the engine E. On the other hand, when the neutral state is selected, since the power transmission between the engine E and the driving wheel D is cut off, the driving wheel D is not locked and thus a driver can pull and move the vehicle easily. That is, the parking state and the neutral state can be switched only by the clutch actuator 14 irrespective of the state of the transmission 1.

In some embodiments, the transmission 1 can be configured as shown in FIG. 11 so that the slippage of the belt V relative to the pulleys P1, P2 can be limited by increasing the sandwiching force (e.g., force applied by the pulleys P1, P2 to side faces of the belt V) by the pulleys P1, P2 relative to the belt V under the parking brake state. In this case, it is preferable that the sandwiching force of the belt V by the pulley P1 in the parking brake state is set larger than the sandwiching force of the belt V by the pulley P1 in the stopped state of the vehicle in the "D" range.

The transmission 1 can therefore be configured to prevent the power transmitting path in the CVT from being cut off, since the slippage of the belt V relative to the pulleys P1, P2 can be limited by increasing the sandwiching force by the pulleys P1, P2 relative to the belt V under the parking brake state. Thus the parking brake state, in which power transmission between the engine E and the driving wheel D is enabled, can be reliably maintained. In addition, it is possible to more effectively prevent the power transmitting path in the CVT from being cut off when the sandwiching force of the belt V by the pulley P1 in the parking brake state is set larger than the sandwiching force of the belt V by the pulley P1 in the stopped state of the vehicle in the "D" range.

In addition, the transmission 1 can be configured as shown in FIG. 11 so that the neutral state can be attained at the "N" range by setting the sandwiching force of the pulleys P1, P2 relative to the belt V so that the belt V does not transmit power when the engine E is in the stopped state. In addition, slippage of the belt V relative to the pulleys P1, P2 can be limited by setting the sandwiching force of the pulleys P1, P2 relative to the belt V so that the belt V transmits power and so that the sandwiching force of the pulleys P1, P2 relative to the belt V is smaller than a sandwiching force of the pulleys P1, P2 relative to the belt V at the "D" range when the vehicle is stopped and the engine E is in the driving state.

In some embodiments, the creep state can be attained in a non-acceleration operation state in the "D" range by performing a creep control so that the vehicle can travel at low speed due to the creep phenomenon of the power transmission path under the idling state of the engine E without operating the accelerator. Accordingly, when the sandwiching force by the pulleys P1, P2 is applied to the belt V, the clutch K can be selectively operated in accordance with the driver's input between a travelling control including a start control when the accelerator operation is done or a travelling control having a gear shift control, and a creep control in which the vehicle can travel under an idling state of the engine E without operating the accelerator.

Some embodiments are configured such that selecting the "P" range using the operating range selector 7 can be completed only when the vehicle speed is lower than a predetermined value and from the "N" range. However, other embodiments can be configured so that selecting the "P" range using the operating range selector 7 can be completed only when the vehicle speed is lower than a predetermined value, or selecting the "P" range using the operating range selector 7 can be completed only from the "N" range.

According to some embodiments, since selecting the "P" range using the operating range selector 7 can be completed only when the vehicle speed is lower than a predetermined value and from the "N" range, it is possible to prevent the travelling state of the vehicle from being shifted to the parking brake state during high speed travel of the vehicle in the "D" range. In addition, if selecting the "P" range using the operating range selector 7 can be completed only when the vehicle speed is lower than a predetermined value, it is possible to prevent the travelling state of the vehicle from being shifted to the parking brake state during travel of the vehicle at a high speed. Finally, if selecting the "P" range using the operating range selector 7 can be completed only from the "N" range, it is possible to prevent the travelling state of the vehicle from being shifted to the parking brake state when a driver would unintentionally select the "P" range due to erroneous operation of the operating range selector 7 in the "D" range.

In some embodiments, since the worm gear reduction mechanism comprising a worm gear 15 and worm wheel 16 can be interposed on an output transmission mechanism from the clutch actuator 14 to the clutch K, it is possible (e.g., as shown in FIG. 11) to maintain the "ON" or "OFF" state of the clutch K when the clutch actuator 14 is under a non-electrically energized state (e.g., when a voltage of the clutch actuator 14 is zero (0)). In addition, since a worm gear reduction mechanism comprising a worm gear 18 and worm wheel 19 can be interposed on an output transmission mechanism from the transmission actuator 17 to the transmission 1, it is possible to maintain states of presence and absence of the sandwiching force of the pulleys P1, P2 relative to the belt V when the transmission actuator 17 is under a non-electrically energized state (e.g., when a voltage of the transmission actuator is zero (0)).

Furthermore, some embodiments can be configured as shown in FIG. 12, so that the engine E can be stopped when the "P" range is selected using the operating range selector 7 while the engine E is in a driving state. Some embodiments can also be configured so that switching from the "P" range to the "N" range can be automatic when a starting operation of the engine E has been performed in the "P" range.

According to some embodiments, since the parking brake state can be attained by automatically stopping the engine E when the "P" range has been selected using the operating range selector 7 during driving of the engine E, it is unnecessary to manually stop the engine E when selecting the "P" range during driving of the engine E. This can improve the operability of the vehicle.

Also in some embodiments, the saddle-type vehicle further comprises an indicator F for performing indications corresponding to the "P" range, the "N" range and the "D" range. The indicator F can be configured to indicate various states of the vehicle, such as vehicle speed, other than the ranges. Such an indicator F can be configured to reliably inform a driver via the indicator that the vehicle has switched to the "N" range when the transmission 1 has been automatically switched from the "P" range to the "N" range when the starting operation of the engine E had been performed in the "P" range.

The control for judging the driver's input by the judgment controller 6 is described below with reference to FIG. 3.

Firstly, a judgment can be made as to whether the operating range selector 7 has triggered the switch corresponding to the "D" range (e.g., S1). If the switch corresponding to the "D" range has not been triggered, a judgment can be made as to whether the switch corresponding to the "N" range has been triggered (e.g., at S2). If the switch corresponding to the "N" range has not been triggered (e.g., as determined at S2), a judgment can be made as to whether the driver's demand is to select the "D" range (e.g., at S3). If a judgment is made that the driver's demand is not to select the "D" range (e.g., as determined at S3), a judgment can be made as to whether an engine start switch (e.g., ignition switch or other similar switch) is "ON" (e.g., at S4).

If a judgment is made that the engine start switch is not "ON" (e.g., as determined at S4), a judgment can be made as to whether the driver's demand is the "N" range (e.g., at S5). If a judgment is made that the driver's demand is the "N" range (e.g., as determined at S5), a judgment can be made as to whether the vehicle speed is lower than a predetermined value (e.g., at S6). If a judgment is made that the vehicle speed is lower than a predetermined value (e.g., as determined at S6), a judgment can be made as to whether the switch corresponding to the "P" range has been triggered (e.g., at S7). If a judgment is made that the switch corresponding to the "P" range has been triggered (e.g., as determined at S7), a judgment can be made as to whether the driver's demand is the "P" range and then such demand can be reflected on the indicator F (e.g., at S12). On the other hand, if a judgment is made that the driver's demand is not the "N" range (e.g., at S5), the judgment controller 6 can be configured to skip steps S6, S7 and advance to steps S9, S12.

If a judgment is made that the switch corresponding to the "N" range has been triggered (e.g., at S2), that the engine start switch is "ON" (e.g., at S4), and either that the vehicle speed is not lower than the predetermined value (e.g., at S6) or that the switch corresponding to the "P" range has not been triggered (e.g., at S7), the judgment controller 6 can be configured to advance to S8, S11, determine whether the driver's demand is the "N" range (e.g., S8), and indicate such demand on the indicator F (e.g., at S11). In addition, if the judgment controller 6 determines that the switch corresponding to the "D" range has been triggered (e.g., at S1) and the driver's demand is the "D" range (e.g., at S3), it can be configured to advance to S10, S13, judge whether the driver's demand is the "D" range (e.g., S10), and indicate it on the indicator F (e.g., at S13).

The control of the engine by the engine ECU 2 according to some embodiments is described below with respect to the flowchart of FIG. 4.

Firstly, a judgment can be made as to whether the ignition switch is "ON" (e.g., at S1). If the ignition switch is "ON", a judgment can be made as to whether the engine kill switch is "ON" or whether the ignition switch is "OFF" (e.g., at S2). If a judgment is made that the engine kill switch is not "ON" (e.g., as determined at S2), a judgment can be made as to whether the driver's intention is to select the "P" range (e.g., at S3).

If a judgment is made that the driver's demand is the "P" range (e.g., as determined at S3), the engine E can be stopped (e.g., using the stop control of the engine ECU 2 at S8). On the other hand, if a judgment is made that the driver's demand is not the "P" range (e.g., as determined at S3), a judgment can be made as to whether the engine E is driving (e.g., at S4). If a judgment is made that the engine E is driving (e.g., as determined at S4), the engine ECU 2 can perform the engine drive control (e.g., at S10). On the other hand, if a judgment is made that the engine E is not driving (e.g., as determined at S4), a judgment can be made as to whether the engine E is starting (e.g. at S5).

If a judgment is made that the engine E is starting (e.g., as determined at S5), a judgment can be made as to whether the start of engine E has been completed (e.g., at S7). If a judgment is made that the start of engine E has been completed (e.g., as determined at S7), to the engine ECU 2 can perform the engine drive control (e.g., at S10). If, on the other hand, a judgment is made that the start of engine E has not been completed (e.g., as determined at S7), to the engine ECU 2 can perform the engine start control (e.g., at S9). If a judgment is made that the engine E is not starting (e.g., as determined at S5), a judgment can be made as to whether the engine start switch is "ON" (e.g., at S6). If a judgment is made that the engine start switch is "ON" (e.g., as determined at S6), the engine ECU 2 can perform the engine start control (e.g., at S9). If, on the other hand, a judgment is made that the engine start switch is not "ON" (e.g., as determined at S6), the engine ECU 2 can perform the engine stop control (e.g., at S8). In addition, if a judgment is made that the ignition switch is not "ON" (e.g., at S1) or that the engine kill switch is "ON" (e.g., at S2), to the engine ECU 2 can perform the engine stop control (e.g., at S8).

The control of the clutch by the clutch controller 5 according to some embodiments is described below with respect to the flowchart of FIG. 5.

Firstly, a judgment can be made as to whether the driver's demand is the "P" range. If a judgment is made that the driver's demand is the "P" range, the parking brake state can be attained (e.g., at S4) by setting the clutch K to "ON". On the other hand, if a judgment is made that the driver's demand is not the "P" range, a judgment can be made as to whether the driver's demand is the "N" range (e.g., at S2). If a judgment is made that the driver's demand is the "N" range, the neutral state can be attained (e.g., at S5) by setting the clutch K to "OFF".

If a judgment is made that the driver's demand is not the "N" range (e.g., as determined at S2), a judgment can be made as to whether the accelerator is "ON" (e.g., at S3). If a judgment is made that the accelerator is not "ON" (e.g., when the accelerator operation is not performed in the driving state), the creep control can be performed (e.g., at S6). On the other hand, if a judgment is made that the accelerator is "ON" (e.g., when the accelerator operation is performed in the driving state), the travel control can be performed (e.g., at S7).

Then, the creep control by the clutch controller 5 of some embodiments is described below with reference to the graph of FIG. 6 and to the flowchart of FIG. 7.

As previously described, the creep control is a control for moving the vehicle under an idling state of the engine E to enable a low speed travel of the vehicle without operation of the accelerator. Such a creep control can be performed by setting the clutch-position angle to ($\Theta C1$) so that the torque capacity (TC) of the clutch K becomes a predetermined value as shown in FIG. 6.

Firstly, the clutch controller can be configured to determine whether a predetermined period of time has elapsed from an output to the actuator for setting the clutch-position angle to ($\Theta C1$), as shown in S1. If the predetermined period of time has not elapsed yet, an initial clutch-position angle in the creep control can be set to ($\Theta C=\Theta C1$) (e.g., at S9) and if the predetermined period of time has elapsed, a feedback control for the creep control (e.g., a feedback control for keeping the idle rotation and feedback control for keeping the torque capacity) can be initiated.

The feedback control for keeping the idle rotation can be as follows. That is, a judgment whether the idle rotation of the engine E is a predetermined value (1) or more is performed (e.g., S2) and a judgment whether the idle rotation of the engine E is a predetermined value (2) or less is performed (e.g., S3). If the idle rotation of the engine E is the predetermined value (1) or more (e.g., at S2), an amount of air supplied to the engine E is reduced (e.g., S5) and the idle rotation of the engine E is lowered. If the idle rotation of the engine E is the predetermined value (2) or less (e.g., at S3), an amount of air supplied to the engine E is increased (e.g., S6) to increase the idle rotation of the engine E.

The feedback control for keeping the torque capacity of the clutch K can be as follows. That is, a judgment is made as to whether an amount of fuel (e.g., injected fuel) supplied to the engine E is a predetermined value or more (e.g., at S4). If the amount of fuel is not the predetermined value or more, the clutch-position angle is set to a value ($\Theta C-\Delta\Theta C$) subtracted a minute angle ($\Delta\Theta C$) from the clutch-position angle ($\Theta C$) (e.g., at S8) to increase the torque capacity of the clutch K. If the amount of fuel supplied to the engine E is the predetermined value or more, the clutch-position angle is set to a value ($\Theta C+\Delta\Theta C$) added a minute angle ($\Delta\Theta C$) to the clutch-position angle ($\Theta C$) (e.g., at S7) to reduce the torque capacity of the clutch K.

Then, the clutch control during travel (e.g., including start control in case of start) by the clutch controller 5 of some embodiments is described below with reference to the graph of FIG. 6 and the flowchart of FIG. 8.

As previously described, the clutch control during travel can be a control for causing the vehicle to travel or start based on the accelerator operation and/or other factors. Firstly, a judgment is made as to whether the clutch K is in the midst of a gear shift due to operation of the operating range selector 7 (e.g., S1). If the clutch K is in the midst of a gear shift, the gear shift control is performed for gear shift (e.g., S9). If the clutch K is not in the midst of a gear shift, a judgment is made as to whether the clutch differential rotation is within a predetermined value (e.g., S2).

If the clutch differential rotation is within the predetermined value (e.g., as determined at S2), it is judged that the steady travel (e.g., travel without gear shift and start) is performed and the clutch-position angle ($\Theta C$) can be set to 0 (e.g., clutch K is set ON) (e.g., as shown at S8). If the clutch differential rotation is not within the predetermined value, a judgment is made as to whether a predetermined period of time has elapsed from the time of output to the actuator for setting to the clutch-position angle ($\Theta C2$) (e.g., S3). If a determination is made that the predetermined period of time has not elapsed yet (e.g., as determined at S3), the start control can be performed and the initial clutch-position angle in the start control can be set ($\Theta C=\Theta C2$) (e.g., at S5). If a determination is made that the predetermined period of time has elapsed, a feedback control for a control during travel can be started.

The feedback control during travel can be as follows. That is, a first judgment can be made as to whether the rotational speed of the engine E is a predetermined value or more (e.g., at S4). If the rotational speed of the engine E is the predetermined value or more, the clutch-position angle can be set to a value ($\Theta C-\Delta\Theta C$) subtracted a minute angle ($\Delta\Theta C$) from the clutch-position angle ($\Theta C$) (e.g., S6) to increase the torque capacity. If the rotational speed of the engine E is not the predetermined value or more, the clutch-position angle can be set to a value ($\Theta C+\Delta\Theta C$) added a minute angle ($\Delta\Theta C$) to the clutch-position angle ($\Theta C$) (e.g., S7) to reduce the torque capacity of the clutch K.

The control of the belt side-pressure (e.g., control of the sandwiching force of the pulleys P1, P2 relative to the belt V) by the gear shift controller 4 is described below with reference to the graph of FIG. 9 and the flowchart of FIG. 10.

As previously described, the belt side-pressure control is a control for selectively varying the sandwiching force of the pulley P1 relative to the belt V of the transmission 1 when the belt V is not being rotated and for selectively varying the pulley gear ratio when the belt V is being rotated. The sandwiching force is controlled by selectively adjusting the rotation number ($\Theta A$) of the output shaft of the transmission actuator 17 (e.g., as shown in FIG. 9).

Firstly, a judgment is made as to whether the driver's demand is the "P" range (e.g., at S1). If a judgment is made that the driver's demand is the "P" range, the rotation number ($\Theta A$) of the transmission actuator 17 can be set to a strong sandwiching force (e.g., side-pressure) as ($\Theta A0+\Theta A3$) (e.g., at S8). On the other hand, if a judgment is made that the driver's demand is not the "P" range, a judgment can be made as to whether the driver's demand is the "N" range (e.g., at S2). If a judgment is made that the driver's demand is the "N" range (e.g., as determined at S2), a judgment can be made as to whether the engine E is stopped (e.g., at S6). If the engine E is not stopped, the rotation number ($\Theta A$) of the transmission actuator 17 can be set to ($\Theta A0-\Theta A2$) (e.g., at S9) so as to have a weak sandwiching force (e.g., side-pressure).

In addition, if a judgment is made that the engine E is stopped (e.g., as determined at S6), a judgment can be made as to whether the pulleys P1, P2 (e.g., the driven pulley) are stopped (e.g., at S7). If a judgment is made that the pulleys P1, P2 are not stopped, the gear shift controller 4 can advance to S9. If a judgment is made that the pulleys P1, P2 are stopped, the rotation number ($\Theta A$) of the transmission actuator 17 can be set to ($\Theta A0-\Theta A1$) (e.g., at S10) so as to have a sandwiching force (e.g., side-pressure) of substantially zero (0).

On the other hand, if a judgment is made that the driver's demand is not the "N" range (e.g., as determined at S2), a judgment can be made as to whether the vehicle is stopped (e.g., at S3). If a judgment is made that the vehicle is not stopped (e.g., the vehicle is travelling), the gear ratio (e.g., pulley gear ratio) can be controlled by actuating the pulleys P1, P2 in accordance with the travelling state of the vehicle (e.g., at S12). If the vehicle is stopped after it has been travelling, the gear shift controller 4 can be configured to learn the reference value by setting $\Theta A0$ based on $\Theta A$ at a stopped time in the "D" range (e.g., as shown at S5 and described below).

In addition, if a judgment is made that the vehicle is stopped (e.g., as determined at S3), a judgment can be made as to whether the vehicle has travelled after learning a previous reference value (e.g., at S4). If a judgment is made that the vehicle has travelled after learning a previous reference value, $\Theta A0$ can be set as a reference of $\Theta A$ (e.g., at S5). Then, the sandwiching force (e.g., side-pressure) can be set to $\Theta A$ (e.g., rotation number of the transmission actuator 17) (e.g., at S11), which is set to $\Theta A0$. On the other hand, if a judgment is made that the vehicle has not travelled after learning a previous reference value (e.g., at S4), the gear shift controller 4 can be configured to skip S5 and advance to S11.

In some embodiments, a saddle-type vehicle can be a two-wheeled vehicle configured to be driven by a driver sitting on a seat and steering a bar handle. The vehicle can comprise, as shown FIGS. 13 and 14, an engine E, a bar handle H, a first brake 8 (which can serve as a first brake means) and second brake 9 (which can serve as a second brake means), a stepwise variable transmission 1', a clutch K, an engine ECU 2 (which can serve as an engine control means), a transmission ECU 3, and an operating range selector 7 (which can serve as an operating means). The same reference numerals are used also in connection with the embodiments illustrated in FIGS. 13 and 14 as those used above in connection with FIGS. 1-12, and detailed descriptions of them will be omitted.

In some embodiments, the second brake 9, which can be operated by a driver's foot, is mounted in place of the second brake 13 as described above. The brake 9 can comprise a foot brake configured to be operated by a foot of a driver sitting on the seat 10. The vehicle (e.g., a two-wheeled vehicle) can be braked by a rear wheel brake (not shown) when the braking operation of the foot brake is detected by a brake operation detection sensor S2.

The clutch K and a transmission 1' can be arranged on the power transmitting path from the engine E to the driving wheel D. The transmission 1' can be a stepwise transmission provided with a dog clutch which can be configured to be automatically shifted to a predetermined gear step in accordance with modes set by the operation range selector 7. Such a transmission 1' can be configured to be controlled by the gear shift controller 4 of the transmission ECU 3 and changed to a state for transmitting the driving power of the engine E to the driving wheel D when it is set to the "D" range (e.g., $1^{st}$ gear⇔ $2^{nd}$ gear⇔ $3^{rd}$ gear⇔ $4^{th}$ gear automatic gear shift).

As shown in FIG. 14, the transmission ECU 3 can be further electrically connected to the vehicle-speed sensor S7 and a shift-drum angle sensor S8 for detecting states (e.g., states of transmission and interruption of power) of the dog clutch of the transmission 1' to determine states of the vehicle speed and the dog clutch. The transmission 1' can be provided with a cam 20 for actuating the dog clutch which can be configured to be operated by the transmission actuator 17. Thus, the vehicle can be configured so that the states of the dog clutch can be detected by detecting the rotational angle of the cam 20 at the shift-drum angle sensor S8.

In some embodiments, the vehicle can switch between a parking brake state, in which power transmission between the engine E and the driving wheel D is enabled when the engine E is in the stopped state, and a neutral state, in which power transmission between the engine E and the driving wheel D is cut off when the engine E is in the stopped state, by actuating the clutch K using the clutch actuator 14.

Accordingly, since the power transmission between the engine E and the driving wheel D can be enabled when the engine E is in the stopped state if the parking brake state is selected, it is possible to easily and reliably park the vehicle on a sloped surface because the driving wheel D can be locked due to friction of the engine E. On the other hand, when the neutral state is selected, since the power transmission between the engine E and the driving wheel D is cut off, the driving wheel D is not locked and thus a driver can pull and move the vehicle easily. That is, the parking state and the neutral state can be switched only by the clutch actuator 14, irrespective of the state of the transmission 1'.

In some embodiments, since the worm gear reduction mechanism comprising a worm gear 15 and worm wheel 16 can be interposed on an output transmission mechanism from the clutch actuator 14 to the clutch K, it is possible to maintain the "ON" state of the clutch K when the clutch actuator 14 is in a non-electrically energized state (e.g., when a voltage of the clutch actuator 14 is zero (0)). In addition, in some embodiments, since the transmission 1' is provided with the cam 20 configured to actuate the dog clutch which is operated by the transmission actuator 17, it is possible to maintain the state of the dog clutch when the transmission actuator 17 is in a non-electrically energized state.

In some embodiments, since the clutch K can be configured to be switched by the clutch actuator 14 between a parking brake state, in which the power transmission between the engine E (which can serve as a driving source) and the driving wheel D is performed under a stopped state of the engine E, and a neutral state, in which the power transmission between the engine E and the driving wheel D is cut off, it is possible to switch between the parking brake state and the neutral state using the clutch actuator 14 and thus lower the manufacturing cost of the clutch K.

According to some embodiments, since the state of the clutch K can be configured to be maintained when the clutch actuator 14 is in a non-electrically energized state, it is possible to maintain the parking brake state and the neutral state without supplying electric power to the clutch actuator 14. In addition, since the saddle-type vehicle can further comprise an operating range selector 7 configured to select a range for attaining the parking brake state (e.g., "P" range), a range for attaining the neutral state (e.g., "N" range), and a range for attaining the driving state (e.g., "D" range), wherein the clutch K and the transmission 1, 1' can be controlled in the driving state in accordance with the travelling state of the vehicle, it is possible to reliably perform operations based on the inputs of a driver.

In some embodiments, since the transmission 1 can comprise a continuously variable transmission (CVT) comprising a belt V forming part of the power transmitting path and a pair of pulleys P1, P2 sandwiching and suspending the belt V, it is possible to smoothly perform the gear shift of the vehicle and to switch between the parking brake state and the neutral state using the clutch actuator 14 configured to operate the clutch K in the vehicle provided with the CVT. This can lower the manufacturing cost of the clutch K.

In addition, since the slippage of the belt V relative to the pulleys P1, P2 can be limited in some embodiments by increasing the sandwiching force of the pulleys P1, P2 relative to the belt V while in the parking brake state, it is possible to prevent cutting off the power transmitting path in the CVT and reliably maintain the parking brake state, in which power transmission between the engine E and the driving wheel D is enabled.

In some embodiments, since the neutral state can be attained in the "N" range when the sandwiching force of the pulleys P1, P2 relative to the belt V is set so that power transmission is not performed by the belt V when the engine E is in the stopped state, and the slippage of the belt V relative to the pulleys P1, P2 can be limited by setting the sandwiching force of the pulleys P1, P2 relative to the belt V so that power transmission is performed by the belt V as well as so that the sandwiching force of the pulleys P1, P2 relative to the belt V is smaller in the range for attaining the neutral state than the sandwiching force of the pulleys P1, P2 relative to the belt V in the "D" range while in the stopped state of the vehicle when the engine E is in the driving state, it is possible to attain the cut-off state and the power transmitting state in accordance with the driving state of the engine E.

In some embodiments, since the saddle-type vehicle can further comprise a transmission actuator 17 which comprises an electrically operated actuator configured to operate to change the pulley position under the electrically energized state so as to adjust the sandwiching force of the belt V as intended and configured to operate to hold the sandwiching force of the pulleys P1, P2 relative to the belt V under the non-electrically energized state of the transmission actuator 17, it is possible to maintain both the power transmitting state and the power cut-off state without supplying electric power to the transmission actuator 17.

According to some embodiments, since when the sandwiching force by the pulley P1 is applied to the belt V in the "D" range, the clutch K can be selectively operated in accordance with the driver's input between a travelling control including a start control when the accelerator operation is done or a travelling control having a gear shift control, and a creep control in which the vehicle can travel under an idling state of the engine E without operating the accelerator, it is possible to quickly start the vehicle corresponding to the accelerator operation when the engine E is accelerated from a stopped state of the vehicle in which the engine E is idling. It is also possible to start the vehicle at a low speed due to continuation of the creep control when a brake releasing operation is performed without any accelerator operation from the stopped state of the vehicle in which the engine E is idling. Thereby, a delicate accelerator operation is not necessary.

According to some embodiments, since the transmission 1' can be a stepwise variable transmission, it is possible to precisely select the gear steps corresponding to the vehicle speed and also to switch between the parking brake state and the neutral state using the clutch actuator 14 which can be configured to operate the clutch K and thus it is possible to lower the manufacturing cost of the clutch K.

Although the vehicles described herein include saddle-type vehicles, the present disclosure is not limited to the described and illustrated embodiments. Thus other structures (e.g., a stepping motor or other structure) may be used as the clutch actuator 14 if the state of the clutch K is maintained under the non-electrically energized state of the clutch actuator 14. In this case, a speed reduction mechanism (e.g., circumscribed gears or some other speed reduction mechanism) may be used in place of the worm gear mechanism by providing an appropriately set detent torque of the stepping motor. Similarly, a stepping motor may be applied to the transmission actuator 17 in place of the worm gear reduction mechanism. In addition, although it is described herein that the sandwiching force only of the pulley P1 is adjustable, it is possible to adjust the other pulley P2 or both the pulleys P1, P2. Furthermore, the saddle-type vehicle of the present disclosure is not limited only to the described and illustrated two-wheeled vehicles and thus the present disclosure may be applied to any other types of vehicles which are driven by a driver sitting on a seat and steered by a bar handle.

The present invention can be applied to other saddle-type vehicles having different appearances and other functions than those described in this application, including saddle-type vehicles in which the clutch can be switched by a clutch actuator between a parking brake state, in which the power transmission between the driving source (e.g., engine) and the driving wheel is performed under a stopped state of the driving source, and a neutral state, in which the power transmission between the driving source and the driving wheel is cut off.

What is claimed is:

1. A saddle-type vehicle which can be driven by a driver sitting on a seat and steering a bar handle, comprising:
a clutch arranged on a power transmitting path from a driving source to a driving wheel or wheels configured to transmit a driving power of the driving source to the driving wheel or wheels and cut off the transmission of driving power of the driving source;
a transmission arranged on the power transmitting path for shifting gears in accordance with a travelling state of the vehicle;
a clutch actuating means comprising an electrically operated actuator for actuating the clutch; and
an operating means for selecting a range for attaining a parking brake state, a range for attaining a neutral state, and a range for attaining a driving state, wherein the clutch and the transmission can be controlled under the driving state in accordance with the travelling state of the vehicle,
wherein the clutch can be switched by the clutch actuating means between the parking brake state, in which the power transmission between the driving source and the driving wheel is performed under a stopped state of the driving source, and the neutral state, in which the power transmission between the driving source and the driving wheel is cut off, and
wherein the parking brake state can be attained by automatically stopping the driving source on a condition that a selecting operation of the range for attaining the parking brake state by the operating means has been performed during driving of the driving source.

2. The saddle-type vehicle of claim 1, wherein the state of the clutch can be maintained when the clutch actuating means is in a non-electrically energized state.

3. The saddle-type vehicle of claim 1 wherein a selecting operation of the range for attaining the parking brake state by the operating means can be completed only from the range for attaining the neutral state.

4. The saddle-type vehicle of claim 1 wherein a selecting operation of the range for attaining the parking brake state by the operating means can be completed only when the vehicle speed is lower than a predetermined value and only from the range for attaining the neutral state.

5. The saddle-type vehicle of claim 1, wherein a switching from the range for attaining the parking brake state to the range for attaining the neutral state can be automatically attained on a condition that a starting operation of the driving source has been performed in the range for attaining the parking brake state.

6. The saddle-type vehicle of claim 5, further comprising an indicator for performing indications corresponding to the range for attaining the parking brake state, the range for attaining the neutral state, and the range for attaining the driving state.

7. The saddle-type vehicle of claim 1, wherein the transmission comprises a continuously variable transmission comprising a belt forming part of the power transmitting path and a pair of pulleys sandwiching and suspending the belt.

8. The saddle-type vehicle of claim 7, wherein the slippage of the belt relative to the pulleys under the parking brake state can be limited by increasing a sandwiching force of the pulleys relative to the belt under the parking brake state to be larger than the sandwiching force of the pulleys relative to the belt in the range for attaining the driving state while the vehicle is stopped.

9. The saddle-type vehicle of claim 7, wherein the neutral state can be attained at the range for attaining the neutral state by setting a sandwiching force of the pulleys relative to the belt so that the power transmission is not performed by the belt when the driving source is in the stopped state, and the slippage of the belt relative to the pulleys can be limited by setting the sandwiching force of the pulleys relative to the belt so that the power transmission is performed by the belt as well as so that the sandwiching force is smaller when in the range for attaining the neutral state and while the driving source is in the driving state than the sandwiching force in the range for attaining the driving state while the vehicle is stopped.

10. The saddle-type vehicle of claim 7, further comprising a transmission actuating means comprising an electrically operated actuator operable to change a pulley position under an electrically energized state so as to adjust a sandwiching force of the pulleys relative to the belt when the belt is not being rotated, adjust a pulley gear ratio while the sandwiching force of the pulleys relative to the belt is applied, and hold the sandwiching force of the pulleys relative to the belt under a non-electrically energized state of the transmission actuating means.

11. The saddle-type vehicle of claim 7, wherein when a sandwiching force of the pulleys relative to the belt is applied to the belt in the range for attaining the driving state, the clutch can be selectively operated in accordance with a driver's input between a travelling control including a start control when an accelerator operation is done or a travelling control having a gear shift control, and a creep control in which the vehicle can travel under an idling state of the driving source without operating the accelerator.

12. The saddle-type vehicle of claim 1, wherein the transmission is a stepwise variable transmission.

13. A saddle-type vehicle which can be driven by a driver sitting on a seat and steering a bar handle, comprising:
   a clutch arranged on a power transmitting path from an engine to one or more driving wheels configured to transmit a driving power from the engine to the one or more driving wheels and cut off the transmission of driving power from the engine to the one or more driving wheels;
   a transmission arranged on the power transmitting path configured to shift gears in accordance with a travelling state of the vehicle;
   a clutch actuator comprising an electrically operated actuator configured to actuate the clutch; and
   an operating range selector configured to select a range for attaining a parking brake state, a range for attaining a neutral state, and a range for attaining a driving state, wherein the clutch and the transmission can be controlled in the driving state in accordance with the travelling state of the vehicle,
   wherein the clutch can be switched by the clutch actuator between the parking brake state, in which power transmission between the engine and the one or more driving wheels is performed when the engine is stopped, and the neutral state, in which power transmission between the engine and the one or more driving wheels is cut off, and
   wherein the parking brake state can be attained by automatically stopping the engine on a condition that a selecting operation of the range for attaining the parking brake state by the operating range selector has been performed during driving of the engine.

14. The saddle-type vehicle of claim 13, wherein the state of the clutch can be maintained when the clutch actuator is not electrically energized.

15. The saddle-type vehicle of claim 13, wherein the transmission comprises a continuously variable transmission comprising a belt forming part of the power transmitting path and a pair of pulleys sandwiching and suspending the belt.

16. The saddle-type vehicle of claim 15, wherein the slippage of the belt relative to the pulleys under the parking brake state can be limited by increasing a sandwiching force of the pulleys relative to the belt under the parking brake state to be larger than the sandwiching force of the pulleys relative to the belt in the range for attaining the driving state while the vehicle is stopped.

17. The saddle-type vehicle of claim 15, wherein the neutral state can be attained at the range for attaining the neutral state by setting a sandwiching force of the pulleys relative to the belt so that the power transmission is not performed by the belt when the engine is in the stopped state, and the slippage of the belt relative to the pulleys can be limited by setting the sandwiching force of the pulleys relative to the belt so that the power transmission is performed by the belt as well as so that the sandwiching force is smaller when in the range for attaining the neutral state and while the engine is in the driving state than the sandwiching force in the range for attaining the driving state while the vehicle is stopped.

18. The saddle-type vehicle of claim 15, further comprising a transmission actuating means comprising an electrically operated actuator operable to change a pulley position under an electrically energized state so as to adjust a sandwiching force of the pulleys relative to the belt when the belt is not being rotated, adjust a pulley gear ratio while the sandwiching force of the pulleys relative to the belt is applied, and hold the sandwiching force of the pulleys relative to the belt under a non-electrically energized state of the transmission actuating means.

19. The saddle-type vehicle of claim 15, wherein when a sandwiching force of the pulleys relative to the belt is applied to the belt in the range for attaining the driving state, the clutch can be selectively operated in accordance with a driver's input between a travelling control including a start control when an accelerator operation is done or a travelling control having a gear shift control, and a creep control in which the vehicle can travel under an idling state of the engine without operating the accelerator.

20. The saddle-type vehicle of claim 13, wherein the transmission is a stepwise variable transmission.

* * * * *